US007348500B2

(12) United States Patent
Zhou

(10) Patent No.: US 7,348,500 B2
(45) Date of Patent: Mar. 25, 2008

(54) DIABETES MELLITUS NUTRITIONAL BALANCE FOR MONITORING THE FOOD AND NUTRITIONAL INTAKE

(75) Inventor: HaiYan Zhou, Xiufen Industry (CN)

(73) Assignee: Shenzhen Baihua Electronics Co. Ltd., Guangdong (CN)

( * ) Notice: Subject to any disclaimer, the term of this patent is extended or adjusted under 35 U.S.C. 154(b) by 48 days.

(21) Appl. No.: 10/704,093

(22) Filed: Nov. 7, 2003

(65) Prior Publication Data
US 2005/0150696 A1 Jul. 14, 2005

(51) Int. Cl.
*G01G 19/414* (2006.01)
(52) U.S. Cl. .............................. 177/25.16; 177/25.19; 128/921
(58) Field of Classification Search .. 177/25.11–25.17, 177/25.19; 128/921
See application file for complete search history.

(56) References Cited

U.S. PATENT DOCUMENTS

| | | | | |
|---|---|---|---|---|
| 3,387,676 A | * | 6/1968 | Porter | 177/17 |
| 3,565,197 A | * | 2/1971 | Carter et al. | 177/230 |
| 4,116,290 A | * | 9/1978 | Fishman | 177/149 |
| 4,223,750 A | * | 9/1980 | Perego | 177/41 |
| 4,260,033 A | * | 4/1981 | Kakuta et al. | 177/34 |
| 4,301,879 A | * | 11/1981 | Dubow | 177/5 |
| 4,366,873 A | * | 1/1983 | Levy et al. | 177/25.19 |
| 4,423,792 A | * | 1/1984 | Cowan | 177/25.19 |
| 4,576,244 A | * | 3/1986 | Zeigner et al. | 177/245 |
| 4,844,187 A | * | 7/1989 | Jabero | 177/5 |
| 4,911,256 A | * | 3/1990 | Attikiouzel | 177/25.16 |
| 5,033,561 A | * | 7/1991 | Hettinger | 177/25.16 |
| 5,044,453 A | * | 9/1991 | Bankier et al. | 177/25.16 |
| 5,233,520 A | * | 8/1993 | Kretsch et al. | 600/300 |
| 5,338,043 A | * | 8/1994 | Rehm | 273/272 |
| 6,538,215 B2 | * | 3/2003 | Montagnino et al. | 177/25.16 |
| 6,978,221 B1 | * | 12/2005 | Rudy | 702/173 |
| 2002/0124017 A1 | * | 9/2002 | Mault | |
| 2002/0134589 A1 | * | 9/2002 | Montagnino et al. | |
| 2002/0137990 A1 | * | 9/2002 | Cardoso | |
| 2003/0159857 A1 | * | 8/2003 | Lin et al. | |
| 2004/0118618 A1 | * | 6/2004 | Davidson et al. | |
| 2005/0184148 A1 | * | 8/2005 | Perlman | |
| 2007/0050058 A1 | * | 3/2007 | Zuziak et al. | |

FOREIGN PATENT DOCUMENTS

| | | | | | |
|---|---|---|---|---|---|
| GB | 2229541 A | * | 9/1990 | | 177/25.16 |
| JP | 54-121771 A | * | 9/1979 | | 177/25.16 |
| JP | 61-193027 | * | 8/1986 | | 177/25.16 |
| JP | 05-231915 | * | 9/1993 | | 177/25.16 |

* cited by examiner

*Primary Examiner*—Randy W Gibson
(74) *Attorney, Agent, or Firm*—Raymond Y. Chan; David and Raymond Patent Firm

(57) ABSTRACT

A nutrition balance for health control, especially for diabetics, to measure a weight and a caloric value of an edible substance, comprising a main body; a scale unit generating a weight signal while receiving the weight of the edible substance; a control unit comprising at least one input unit inputting a predetermined reference data and providing a reference data signal; a control system comprising a memory unit storing a predetermined balance database information and a controller, communicating with the memory unit, communicated with the scale unit to receive the weight signal and communicate with the input unit for receiving and storing the reference data signal to generating an output signal in response to the weight signal according to the reference data and the balance database information; and a display arrangement communicating with the control system to provide an output. The nutrition balance is for monitoring health and diet.

15 Claims, 22 Drawing Sheets

DIABETES MELLITUS NUTRITIONAL BALANCE FOR MONITORING THE FOOD AND NUTRITIONAL INTAKE

BACKGROUND OF THE PRESENT INVENTION

1. Field of Invention

The present invention relates to a nutritional balance and a method of monitoring the food and nutritional intake for diabetes, and more particularly to a nutritional balance which is capable of monitoring the food and nutritional intake and controlling the daily caloric intake obtained from food while providing a reference information for a reasonable carbohydrate, protein and lipid combination and recording the daily intake of the caloric value obtained from different kinds of food. In other words, the present invention provides a health monitoring balance system in food and nutritional science which is especially important for monitoring the diet and health of diabetics.

2. Description of Related Arts

Food and nutritional science is playing an important role, particularly, in the developed countries. It gains our special awareness when the problem of obesity and its related diseases are rising dramatically throughout the world. Obesity may be a trigger or a cause to many diseases such as heart disease, high blood pressure and diabetes mellitus. Owing to the fact that an imbalance diet or an excess intake of food may lead to obesity, we all understand how important our diet is affecting our health.

Obesity is one of the major triggers of Diabetes Mellitus while both obesity and diabetes mellitus is one of the worldwide health problems. Patient suffered from diabetes mellitus has absolutely or relatively insufficient insulin secretion from pancreas which is vital for glycogensis that excessive blood glucose is converted to glycogen for storage. Some obvious symptoms of diabetes mellitus are excess thirst, extreme hunger, frequent urination, weight loss, glucose lost in urine, high blood glucose level and a variety of complications including blurred eyesight and stoke. For many years, medical treatments of diabetes are waiting for a breakthrough and specialists are working hard to find a solution for this disease. However, as it is relatively difficult to cure the disease by the present findings and technology, a wide variety of methods have been employed for diabetes treatment. Existing methods includes psychological treatment, diet treatment, exercise treatment, medicine treatment (including traditional Chinese medicine, western medicine and insulin treatment) and blood glucose control. Referring to the different gravities and status of the patients, different methods are employed to fit individual's need. For example, some patients may use only one method of treatments to control their diseases while others may require several method of treatments to monitor their diseases. Among the diabetics, irrespective of their types of diabetes and gravities of illness, it is necessary that a predetermined diet must be followed. That is to say, a diet treatment is a basic necessary treatment for treating diabetics.

A diet treatment is usually a self-control treatment of the patient himself directed by a doctor. Thus it is very difficult to achieve a satisfactory result because it requires the patient himself to follow a diet according to the food and nutritional science and the quantitative control with reasonable combinations and strict rules. Diabetes mellitus is a commonly occurred disease in the world, and international nutritional organization has made a standard classification of food for providing an accurate guidance for food and nutrients. It is well-known in the developed countries that food is divided amongst six categories as being A to F in a Food Guide Pyramid. The six categories, A to F, generally are A: Cereal, bread, rice, pasta group (containing food obtained grains), B: Vegetable group, C: Fruit group, D: Milk, yogurt and cheese group, E: Meat, poultry, fish, dry beans, eggs and nuts group, and F: Fats, oils and sweets group.

On the other hand, an electronic balance is commonly used for getting a weight reading in daily life. This kind of balance comprises a weighing container, a weighing unit and a display wherein the display is usually incorporated with simple numerical scale and that only the weight value is shown. There seems no direct relationship between the balance and food and nutritional science or diabetes mellitus and the use of a balance for diet control has not been discovered and utilized. If it is possible to use a balance to obtain a nutritional value of food being eaten, it would be a great breakthrough for diet control with a balance.

SUMMARY OF THE PRESENT INVENTION

A main object of the present invention is to provide a nutrition balance for measuring and calculating a caloric value of food wherein the nutrition balance comprises a central processing system adapted for receiving an input signal and generating a output signal according to the input signal such that a category of a predetermined edible substance is adapted to be recorded, analyzed and displayed and that a caloric value of the predetermined edible substance is determined, stored and displayed so as to generate, store and display an intake record of an edible substance.

Another object of the present invention is to provide a nutrition balance for measuring and calculating a caloric value of food comprising a central processing system adapted for determining, storing and displaying a predetermined caloric limit according to data received so as to acted as a monitoring system for daily caloric intake.

Another object of the present invention is to provide a nutrition balance for measuring and calculating a caloric value of food comprising a central processing system adapted for receiving a plurality of predetermined input signals and generating a plurality of predetermined output signals according to the input signals such that a category of a predetermined edible substance is adapted to be recorded, stored and displayed and that a caloric value of the predetermined edible substance is determined, stored and displayed so as to generate, store and display an intake record of an edible substance wherein the central processing system further comprises a time unit for time measurement and is further adapted to organizing the intake records of the edible substances within a day such that a daily caloric record is obtained.

Another object of the present invention is to provide a nutrition balance for controlling the daily caloric intake of diabetics comprising a main body for measurement and a central processing system adapted for receiving a plurality of predetermined input signals and generating a plurality of predetermined output signals according to the input signals such that a category of a predetermined edible substance is adapted to be recorded, stored and displayed and that a caloric value of the predetermined edible substance is determined, stored and displayed so as to generate, store and display an intake record of an edible substance wherein the central processing system further comprises a time unit for time measurement and is further adapted to organizing the intake records of the edible substances within a day such that a daily caloric record is obtained and a diet database is created for monitoring the diet of diabetics.

Another object of the present invention is to provide a nutrition balance for controlling the daily caloric intake of diabetics comprising a main body for measurement and a central processing system adapted for determining, storing and displaying a predetermined caloric limit according to data received such that the diabetics is capable of controlling their diets according to the caloric limit provided.

Another object of the present invention is to provide a nutrition balance for controlling the food and nutrients intake of patients suffered from diabetes mellitus, comprising a microprocessor adapted for providing a control so as to provide a guidance for a predetermined reasonable composition of carbohydrate, protein and fat and limit the total daily caloric intake from food while record a daily caloric intake from different food sources.

Accordingly, in order to accomplish the above objects, the present invention is a nutrition balance comprising:

a main body;

a scale unit provided on the main body such that the scale unit is adapted to movably connected to the main body;

a control unit provided on the main body comprising a plurality of predetermined key units wherein the key units are adapted for selecting a calculation method;

a control system, communicated with the control unit and the scale unit, capable of processing a data signal received such that a caloric value of a predetermined edible substance is determined and a standard caloric value is generated and recorded in the control database system; and a display communicated with the control system provided on the main body wherein a plurality of predetermined display units is provided thereon for display an output.

These and other objectives, features, and advantages of the present invention will become apparent from the following detailed description, the accompanying drawings, and the appended claims.

DETAILED DESCRIPTION OF THE PREFERRED EMBODIMENT

Figure 1:
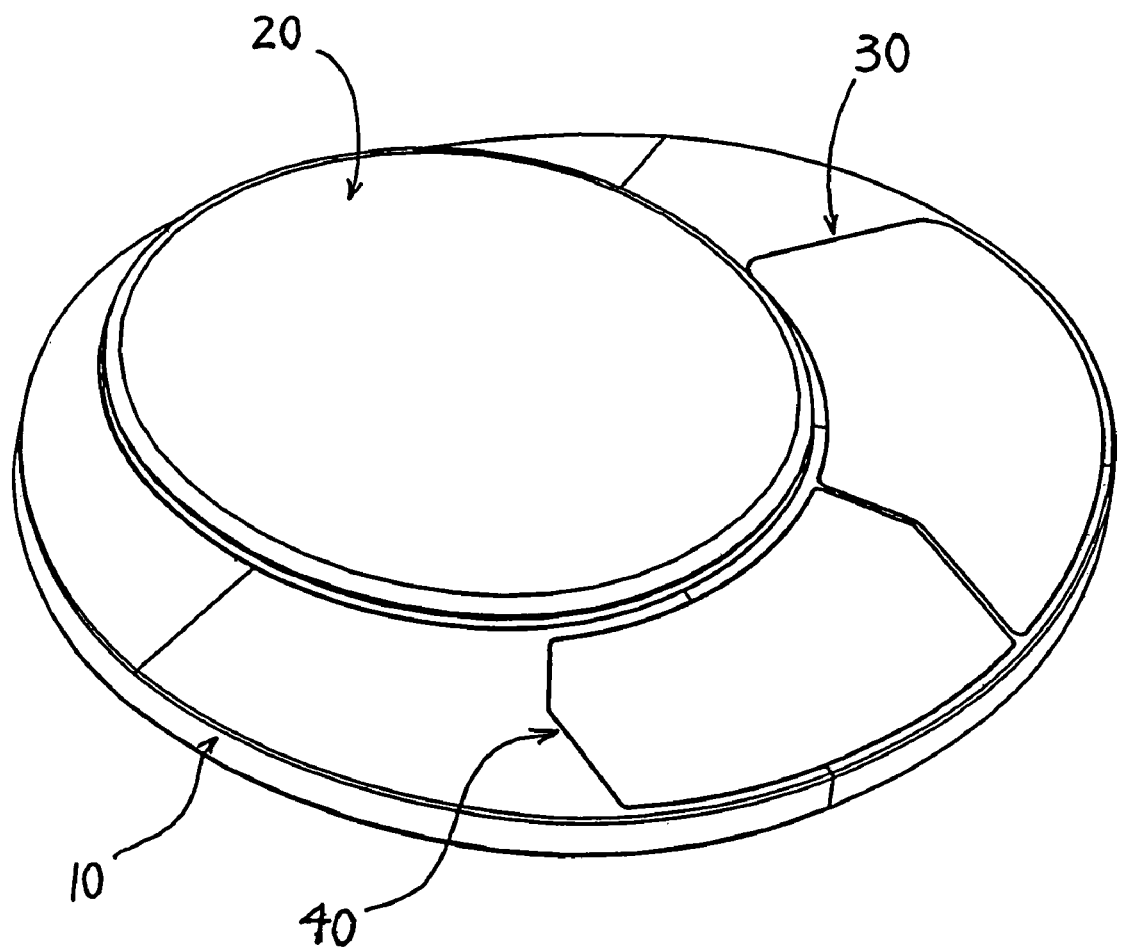
FIG. 1 is the perspective view of a nutrition balance of the present invention according to a first preferred embodiment.

Referring to FIG. 1 to 5 of the drawings, the present invention is a nutrition balance comprising a main body 10, a scale unit 20, a control unit 30, a display 40 and a control system 50.

Figure 2:
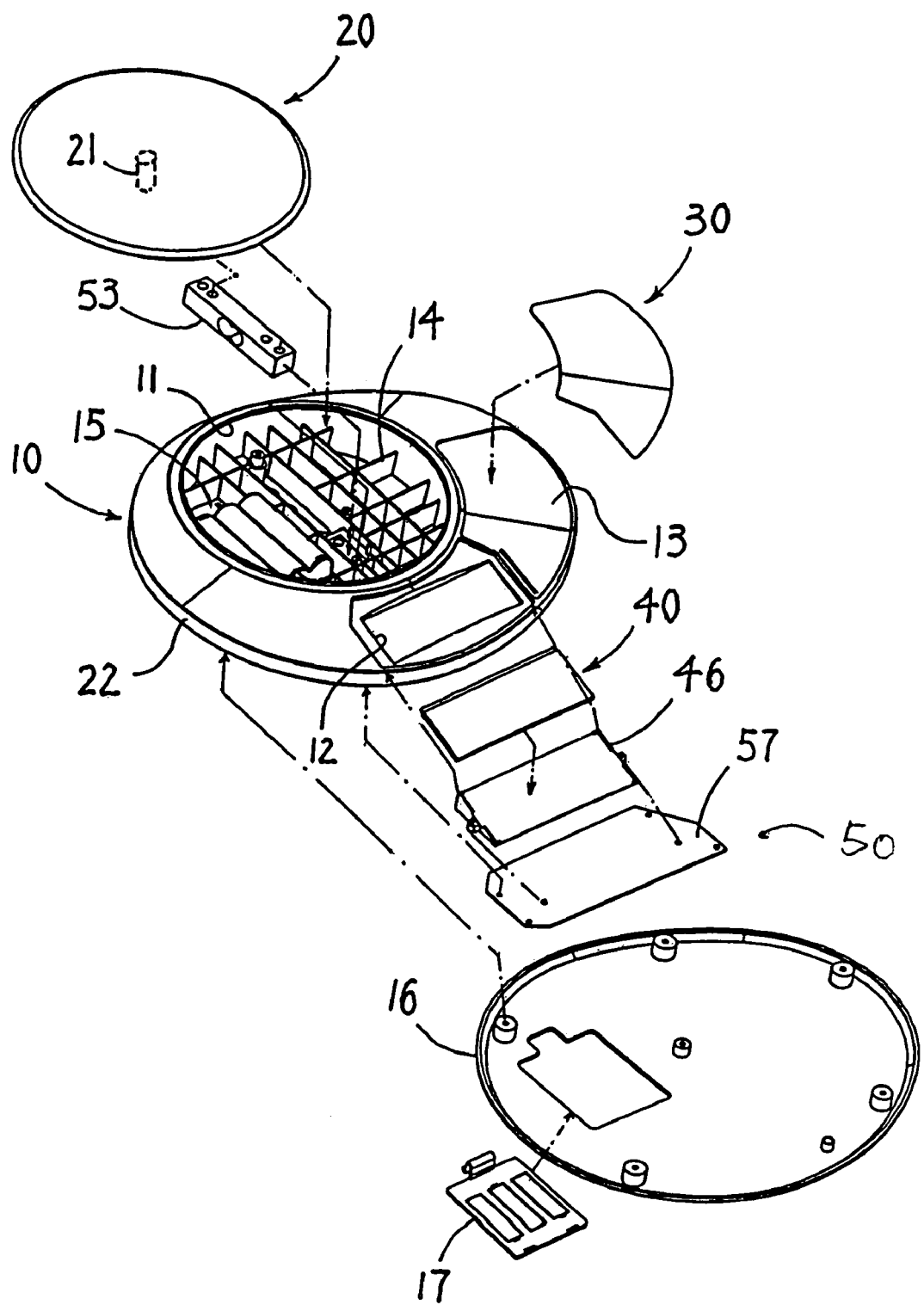
FIG. 2 is the partial exploded view of the nutrition balance of the present invention according to the first preferred embodiment.
Figure 3:
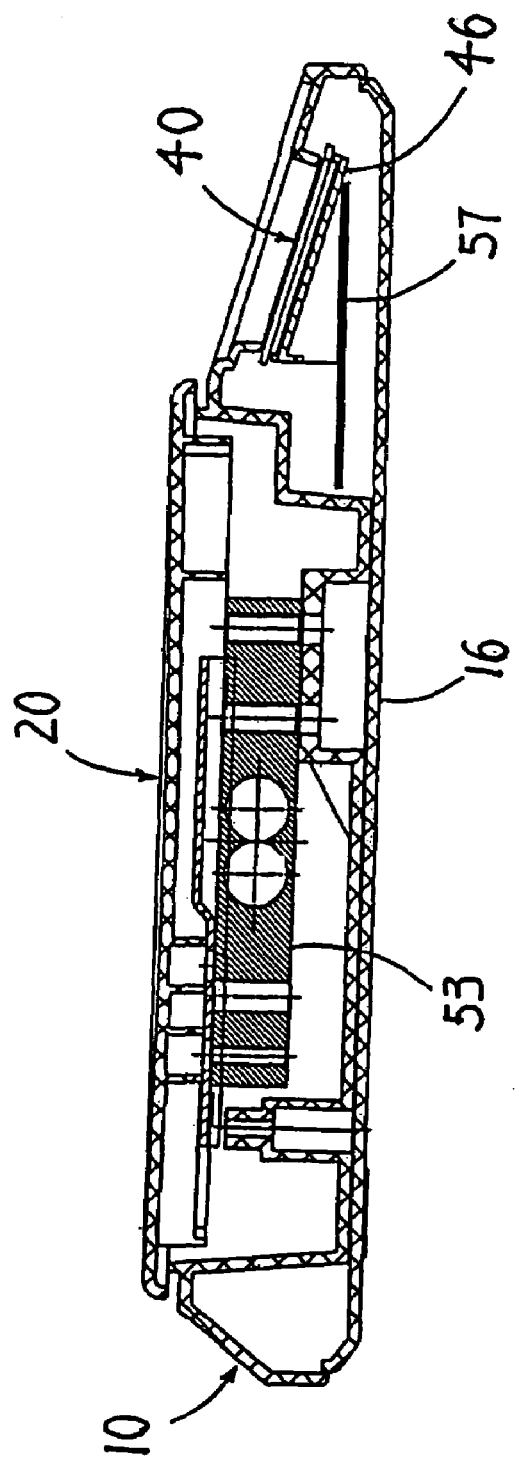
FIG. 3 is the sectional side view of the nutrition balance according to the first preferred embodiment of the present invention.

The nutrition balance according to a preferred embodiment of the present invention, as shown in FIGS. 1 to 3, comprises the main body 10 which is a flat case body comprising a top case body 18 having a central cavity surrounded by a central window and a bottom case body 16 wherein the top case body 18 has a scale connecting portion 11 movably connecting with the scale unit 20, a display connecting portion 12 connecting to the display 40 and a control unit connecting portion 13 connecting with the control unit. The scale unit 20 has circular shape and the display 40 comprises a rectangular LCD display as shown in FIG. 2. The main body 10 further comprises a framework body 14 provided in the central cavity, wherein a battery compartment 15 is defined therein for positioning a battery therein. The framework body 14, according to the preferred embodiment, comprises a check shaped framework as shown in FIG. 2. The bottom case body 16, which is connected to a bottom portion of the top case body 18, has a battery opening and comprises a detachable battery cover 17 adapted for covering the battery opening. It is appreciated that properties, such as size and shape of the main body and the shape of the scale unit, are not limited as described above.

According to the preferred embodiment of the present invention, as shown in FIG. 2 of the drawings, the scale unit 20 has a circular shape and a top plane surface, and comprises a positioning unit 21 provided in a central bottom portion of the scale unit 20 and a peripheral positioning unit 22 surrounding the scale unit 20 to define a recess cavity, wherein the positioning unit 21 is movably connected to the main body 10 and the peripheral positioning unit 22 is movably connected to the central window of the top case body 18 of the main body 10 for maintaining a predetermined position of the scale unit 20 on the main body 11. The scale unit 20 further comprises a strengthener having a round shape or a radiate shape to increase a strength of the scale unit 20.

Figure 4:
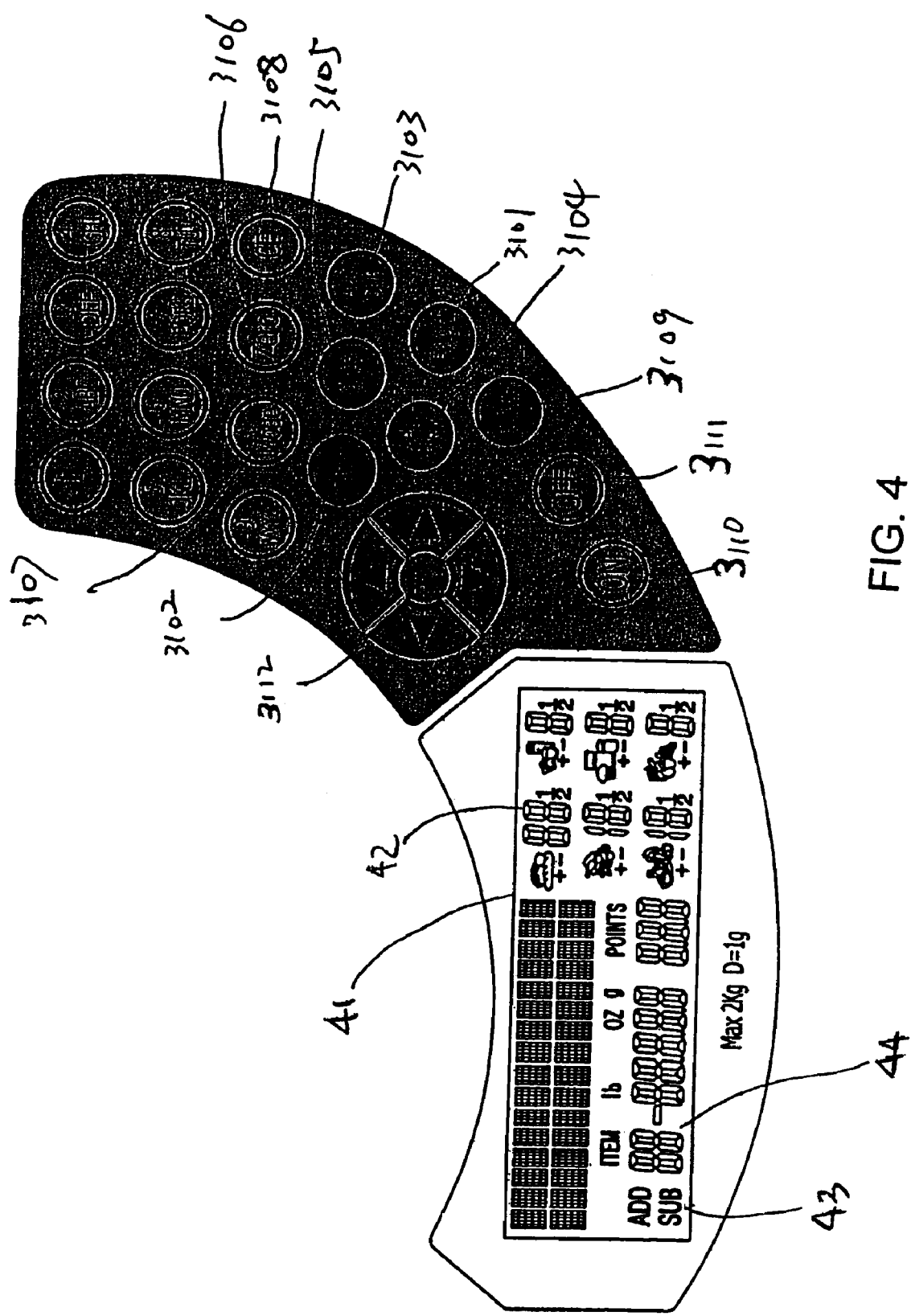
FIG. 4 is the plan view of a control system of the nutrition balance of the present invention according to the first preferred embodiment.

The control unit 30 is provided on the control unit connecting portion 13 of the main body 10, as shown in FIG. 2 of the drawings. The control unit 30 comprises at least one predetermined input unit. Referring to FIG. 4 of the drawings, examples of the input unit include a predetermined operation key set 31 and number/alphabet key set 32.

The operation key set 31 comprises a plurality of operation keys including a food key 3101 for inputting a signal for checking an actual weight of a standard exchange portion of an edible substance and a number of exchange portion of 100 grams of the edible food, a history key 3102 for inputting a signal for checking a daily caloric intake record and an overall exchange portion record according to a saved caloric record of a category of the edible substance, an add/sub key 3103 for inputting a signal for shifting to a add/sub mode, a set/view key 3104 for inputting a signal for setting or viewing data, a g/oz key 3105 for inputting a signal for shifting to a desire mode of unit of measurement such as universal unit or British unit; a zero key 3106 for inputting a signal for resetting the nutrition balance to zero, a 0/mode key 3107 for inputting a signal for inputting a zero (0) number or shifting to a mode of addition or subtraction, a CE key 3108 for inputting a signal for cancellation of an immediate inputting signal or other input data, an enter key 3109 for inputting a signal for confirming an input signal, an on key 3110 for inputting a signal for switching on the nutrition balance, an off key 3111 adapted for inputting a signal for switching off the nutrition balance, and a navigation key 3112 for inputting a signal for reading data records and adding or subtracting data.

The number/alphabet key set 32 comprises means for numerical inputting from 0 to 9 and alphabet inputting from a to z. As shown in FIG. 4 of the drawings, the number/alphabet key set 32 includes 10 key units provided on the control unit 30 for number and alphabet input. The operation key set 31 and the number/alphabet key set 32 may employ the membrane switch technology as in the cell phone industry.

Referring to FIG. 2 and 4 of the drawings, the display 40 is positioned adjacent to the control unit 30 on the top case body 18 of the main body 10 and comprises a display frame 46 connecting the display 40 to the display connecting portion 12 of the main body 10, wherein the display 40 is adapted to visualize a predetermined signal in response to the signal generated by the control system 50.

The display 40, communicating with the control system, is adapted for providing an output in response to the control system. Methods of display may be a visual display, an audio display, a combination of visual and audio display, or simply an output display signal for an electronic equipment such as a PDA or the like. According to the preferred embodiment of the present invention, as shown in FIG. 4 of the drawings, the display 40 comprises a standard food classification figure unit 41, a predetermined number of standard food classification digital display units 42, an add/sub mode and key display unit 43 and a predetermined number of add/sub digital display unit 44. The standard food classification figure unit 41 includes six food figures representing six categories of edible substances from group A to F, which are A: Cereal, bread, rice, pasta group (containing food obtained grains), B: Vegetable group, C: Fruit group, D: Milk, yogurt and cheese group, E: Meat, poultry, fish, dry beans, eggs and nuts group, and F: Fats, oils and sweets group, according to the international nutritional association. The standard food classification digital display unit 42 includes six food digital displays and each food figure is provided next to a corresponding food digital display respectively for displaying a numerical value in response to the control system 50. The add/sub mode and key display unit 43 comprises an add mode key, a sub mode key, an item key, a pound unit key, a ounce unit key, and a point key, and each key has a corresponding add/sub digital display unit for displaying a numerical value in response to the control system 50.

The control system 50, which is communicated with the scale unit 20, the control unit 30 and the display 40 for controlling the nutrition balance, stores a nutrition balance database and comprises a controller unit such as a microcontroller unit (MCU) 51 adapted for receiving a signal and generating an output signal in response to the input signal, wherein the control system 50 is capable of processing a data received, determining a caloric value of a predetermined edible substance according to the balance data, generating a daily or a unit caloric requirement, and recording a daily caloric intake automatically.

Figure 5:
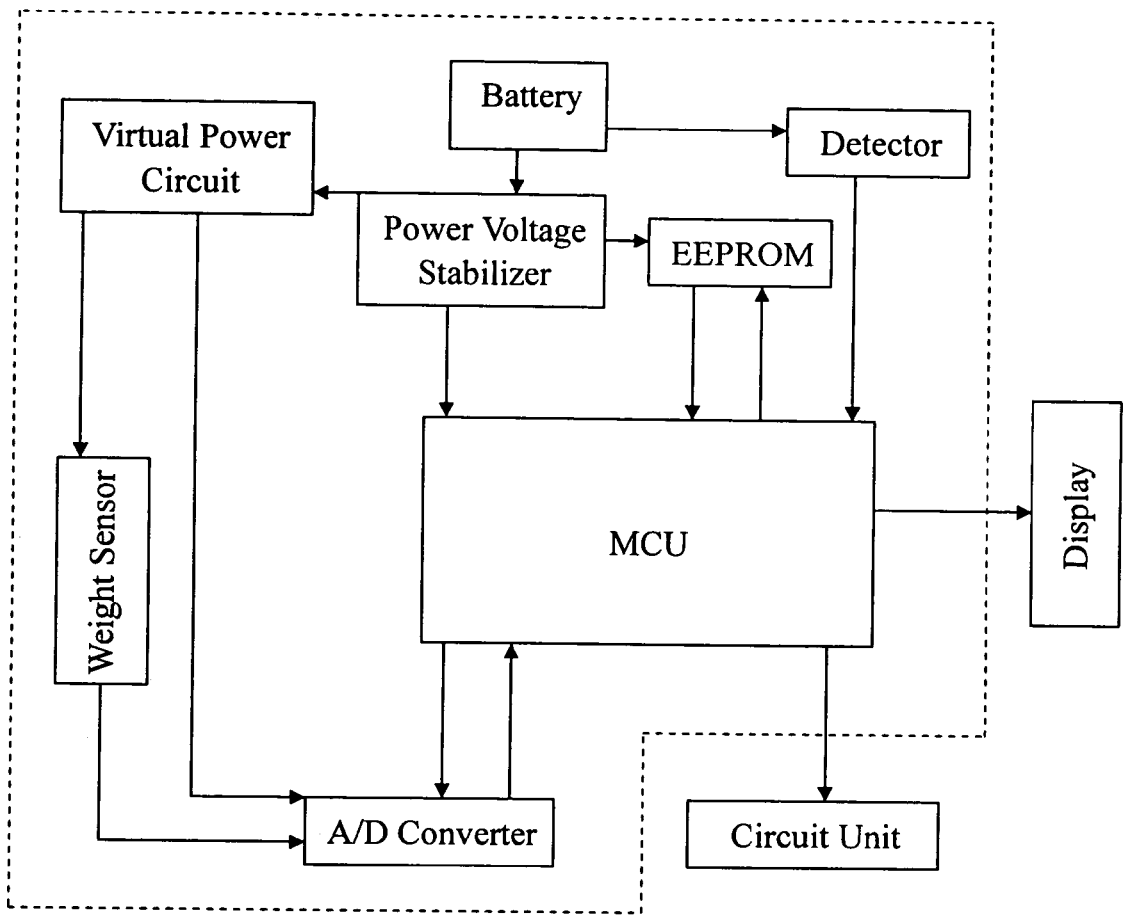
FIG. 5 is the illustrative-diagram showing the communication of the control unit of the nutrition balance according to the first preferred embodiment of the present invention.

Referring to FIG. 5 of the drawings, the control system 50 according to the preferred embodiment further comprises a A/D converter 52 and a weight sensor 53. The MCU 51 comprises a read-only memory (ROM) for storing a plurality of data and an electrically erasable programmable read-only memory (EEPROM) 511. The read-only memory (ROM) is capable of storing a nutrition balance database such as a caloric database of a unit quantity of a plurality of predetermined edible substances (kilocalorie per 100 grams), reference numbers of a plurality of predetermined edible substances, food guide pyramid database according to international standard, daily normal unit quantity caloric usage of diabetics and a modification database for individual amendment, and personal reference database having body mass index information, height and weight reference information and time and date information stored therein. The ROM is also adapted to receiving input data and creating a history record from the input data.

The MCU 51 of the control system communicates with the control unit 30, the display 40 and the A/D converter respectively for processing data or signal and control. The weight sensor 53 is a differential sensor provided below a predetermined bottom portion of the scale unit 20 in the central cavity of the top case body 18 to communicate with the A/D converter 52.

Referring to FIG. 5 of the drawings, the MCU 51, according to the preferred embodiment, further comprises a virtual power circuit 54, a power voltage stabilizer 55 and a power voltage detector 56 provided on a main circuit 57 of the MCU 51 to optimize the stability of the operation of the nutrition balance of the present invention. The MCU 51 also comprises a timing unit provided thereon for time measurement of the control system 50. A power source arrangement for providing power to the nutrition balance may be a direct current (DC) or an alternate current (AC) power supply such as a battery 58, as shown in FIG. 5.

According to an application of the nutrition balance of the present invention, a weighing process of an edible substance for the nutrition balance as described above, is processed, which comprises the steps of:

a) providing a predetermined edible substance A on the nutrition balance;

b) transmitting a weight of the substance A to the weight sensor for inducing a disturbance to the weight sensor;

c) forming a signal A in the form of a corresponding voltage in response to the weight of the substance A which is transmitted to the A/D converter wherein a magnitude of the signal represents in proportional to the weight of the substance A;

d) transforming the signal A to the form of a frequency A corresponding to the signal A and transmitting the frequency A to the MCU 51; and e) providing the weight of the substance A by the MCU which analyses the frequency A and displaying the weight of the substance A on the display.

Figure 6:
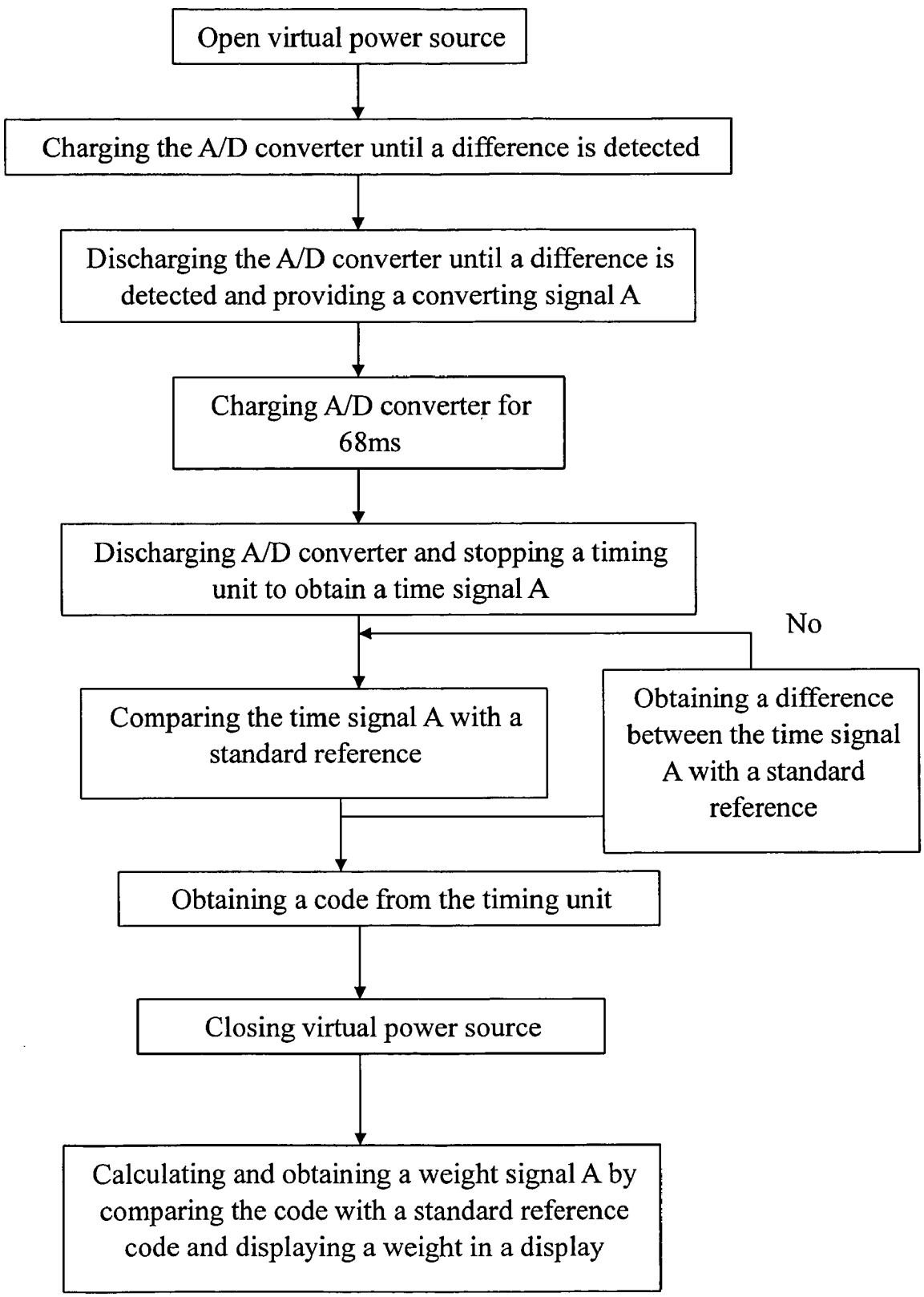
FIG. 6 is the process of measurement of the nutrition balance according to the first preferred embodiment of the present invention.

Referring to FIG. 6 of the drawings, a first preferred application of the present invention provides a process of weight measurement of the nutrition balance for an edible substance controlled by the control system 50 which comprises the measuring steps of:

M1) providing an edible substance A on the scale unit and initiating the virtual power circuit such that a weight signal A is generated;

M2) in response to the start signal A, charging and discharging the A/D converter respectively so as to provide a converting signal A; and M3) in response to the converting signal A stopping the timing unit to obtain a time signal A and comparing the time signal A with a standard reference pre-set in the MCU for calculation such that a weight output signal A is obtained.

The weight output signal A obtained from the process of weight measurement may then be displayed through the display.

Figure 7:
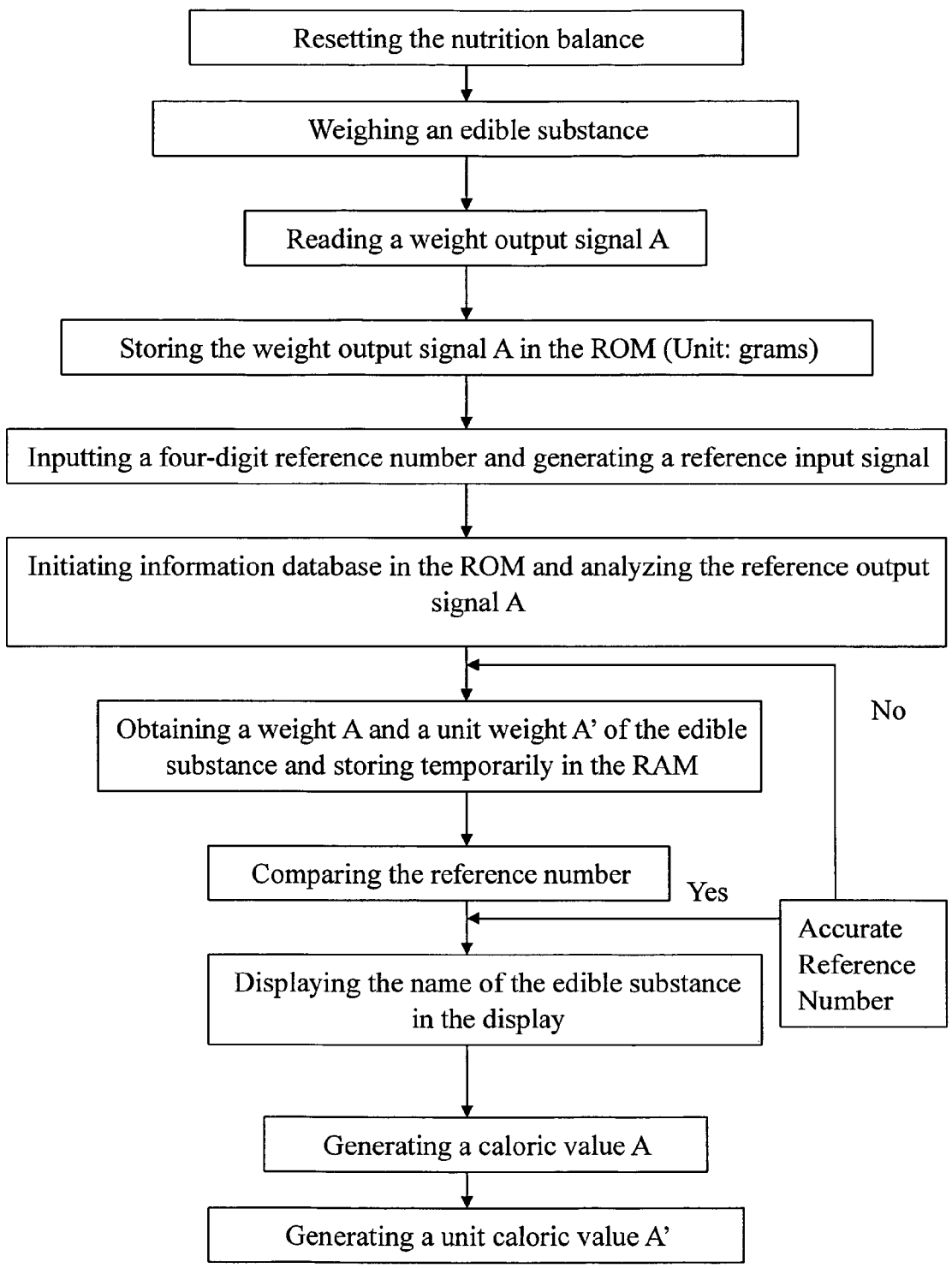
FIG. 7 is the process of caloric measurement of the nutrition balance according to the first preferred embodiment of the present invention.

Referring to FIG. 7 of the drawings, a second preferred application of the nutrition balance of the present invention provides a process of caloric measurement for an edible substance comprising the caloric measurement steps of:

C1) resetting the nutrition balance and obtaining the weight output signal A of the edible substance A through the process of weight measurement;

C2) storing the weight output signal A in the ROM of the control system;

C3) generating a reference input signal by inputing a reference number of the edible substance A through the control unit;

C4) analyzing the reference input signal A according to a weight A and a unit weight A' of the edible substance A wherein the weight A and the unit weight A' are obtained from the weight output signal; and C5) generating a caloric signal A containing caloric value A after the step (C4).

The reference number of the edible substance A is a four-digit code in the second preferred application of the present invention as shown in FIG. 7. The process of caloric measurement of the present invention may further comprise a step (C6): generating a unit exchange signal A by dividing the caloric value A by ninety. The caloric signal A and the unit exchange signal A are displayed with a display such as a LCD display.

Figure 8:
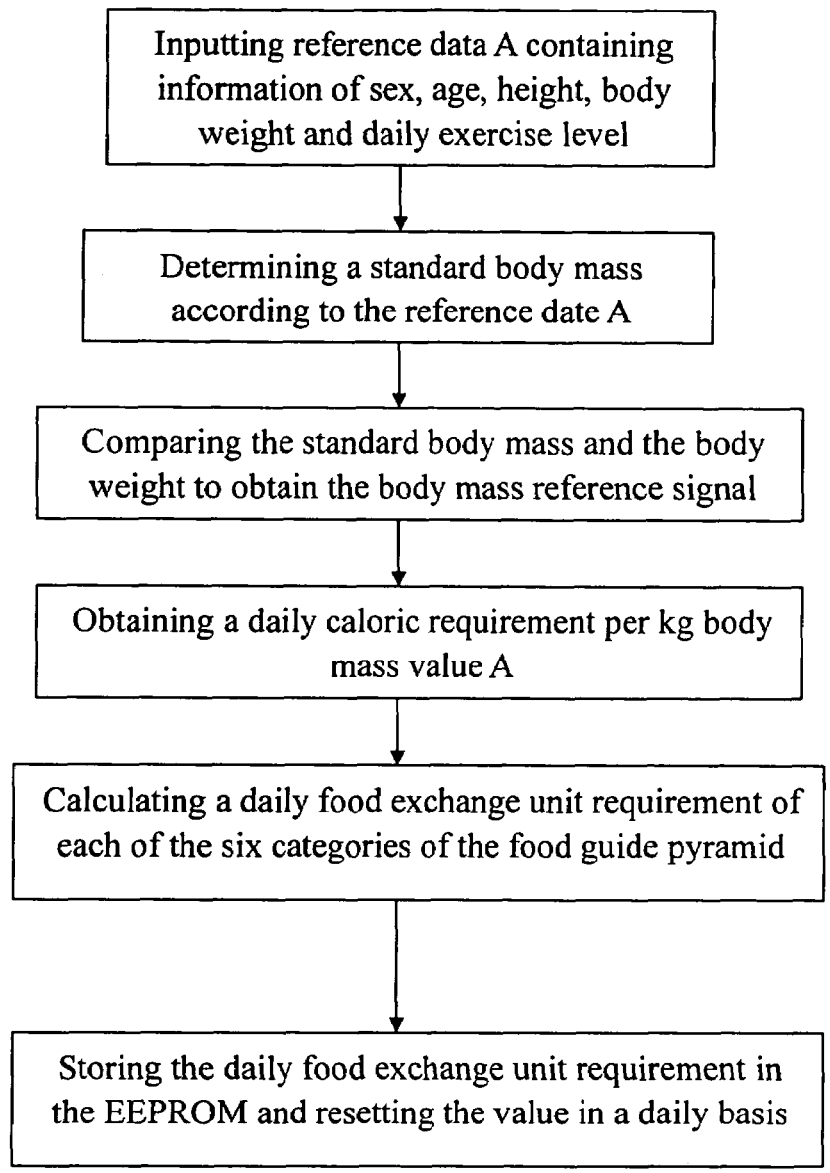
FIG. 8 is the process of providing a daily diet requirement using the nutrition balance according to the first preferred embodiment of the present invention.

Referring to FIG. 8 of the drawings, a third preferred application of the present invention provides a process of daily diet requirement measurement with the nutrition balance. In order to obtain a body mass reference signal, the process of daily diet requirement measurement comprises the steps of:

D1) inputting reference data A containing information of sex, age, height, body weight and daily exercise level;

D2) determining a standard body mass according to the reference data A; and

D3) comparing the standard body mass obtained in D2 and the body weight in D2 such that the body mass reference signal is obtained.

The body mass reference signal is capable of dividing into three categories overweight, normal, and underweight forming three sub-signals respectively. Normal is defined as the body weight is less than 10% greater and less than 10% lower than the standard body mass. Overweight is defined as the body weight is at least 10% greater than the standard body mass and underweight is defined as the body weight is at least 10% less than the standard body mass.

The daily exercise level, as shown in the third preferred application of the present invention as shown in FIG. 8, is divided into four categories: resting, light, medium, and heavy.

When the present invention is designed for diabetic's use, the nutritional database will comprise a diabetic's caloric requirement (adult) database which consists of reference daily caloric requirement per kg body mass values corresponding to the exercise level and body mass reference respectively.

With reference to the nutritional database, a daily caloric requirement per kg body mass value A is obtained. Therefore a total daily caloric requirement A is calculated and obtained or a caloric requirement per meal is calculated and obtained. Total daily caloric requirement is the product of the standard body mass and the daily caloric requirement per kg body mass value A by multiplication. The minimum daily caloric requirement for a healthy person under resting is 1,200 kcal.

A daily food exchange unit requirement A of is then calculated and obtained according to the above process and distributed amongst the categories of the food guide pyramid in a predetermined proportion. The caloric value of a standard food exchange unit is 10 kcal and the daily food exchange unit requirement A is obtained by dividing the total daily caloric requirement A (kcal) by 90 (kcal). Thus, a daily diet requirement showing the daily food exchange unit requirement which is distributed amongst the six group according to the food guide pyramid is obtained and displayed.

The present invention is capable of providing reference information indicating whether a daily caloric intake of a user is above or below the daily caloric requirement and this is especially important for diabetics. The user, simply by placing food on the nutrition balance before eating and entering the reference number of the food, is capable of obtaining the difference between the daily caloric requirement and the daily caloric intake such that the user is capable of following the daily caloric requirement easily.

The nutrition balance of the present invention is capable of being used as a control device for a person especially person required caloric intake control. The control system 50 is capable of generating the daily caloric requirement according to the input data at a predetermined time, subtracting the caloric intake from food according to the food provided on the scale unit 20 and saving the total daily caloric intake records according to each caloric intake from food in a day in the EEPROM while generating another daily caloric requirement for the anther day. All the above information is capable of displayed by a display 40. Thus, the daily caloric intake records is stored and is capable of retrieved for a user's reference.

Figure 9A:
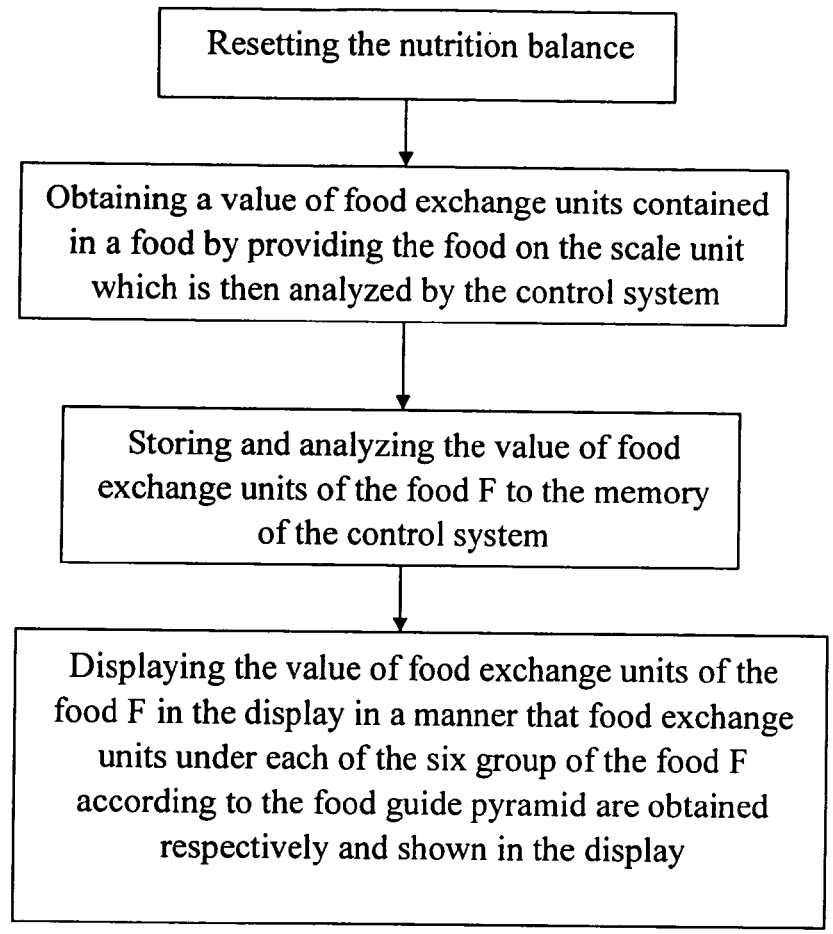
FIG. 9A is the flow diagram of additive calculation method of calculation systems of the nutrition balance according to the first preferred embodiment of the present invention.
Figure 9B:
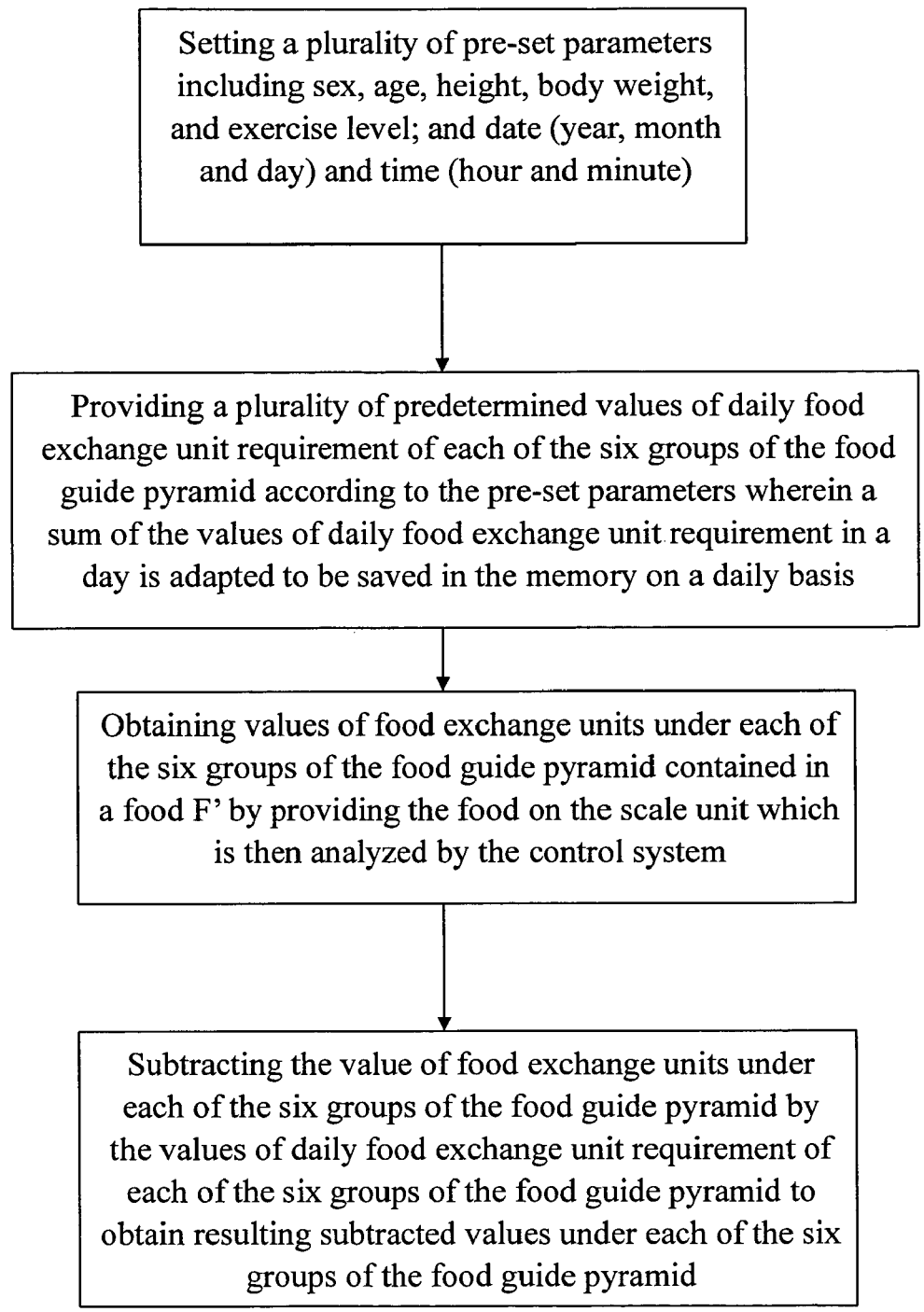
FIG. 9B is the flow diagram of subtractive calculation method of calculation systems of the nutrition balance according to the first preferred embodiment of the present invention.

Referring to FIGS. 9A and 9B of the drawings, the present invention provides a process of calculation for determination of a difference between the daily caloric intake and the daily caloric requirement. The process may employ an additive calculation method or a subtractive calculation method. As shown in FIGS. 9A and 9B of the drawings are operative flow charts of the process of calculation employing the additive calculation method and the subtractive calculation method respectively.

As shown in FIG. 9A of the drawings, the additive calculation method comprises the steps of:

A1) resetting the nutrition balance;

A2) obtaining a value of food exchange units contained in a food F by providing the food on the scale unit which is then analyzed by the control system;

A3) storing and analyzing the value of food exchange units of the food F to the memory of the control system; and A4) displaying the value of food exchange units of the food F in the display in a manner that food exchange units under each of the six group of the food F according to the food guide pyramid are obtained respectively and shown in the display.

As shown in FIG. 9B of the drawings, the subtractive calculation method comprises the steps of:

S1) setting a plurality of pre-set parameters including sex, age, height, body weight, and exercise level; and date (year, month and day) and time (hour and minute);

S2) providing a plurality of predetermined values of daily food exchange unit requirement of each of the six groups of the food guide pyramid according to the pre-set parameters wherein a sum of the values of daily food exchange unit requirement in a day is adapted to be saved in the memory on a daily basis;

S3) obtaining values of food exchange units under each of the six groups of the food guide pyramid contained in a food F' by providing the food on the scale unit which is then analyzed by the control system; and S4) subtracting the value of food exchange units under each of the six groups of the food guide pyramid by the values of daily food exchange unit requirement of each of the six groups of the food guide pyramid to obtain resulting subtracted values under each of the six groups of the food guide pyramid.

When the resulting subtracted value is zero, it means that the food intake and the food required is equal. When the resulting subtracted value is negative, it means that the food intake is less than the food required. When the resulting subtracted value is positive, it means that the food intake is in excess compared with the food required. Therefore, the user is capable of following the resulting subtracted values to adjust any food intake required or in excess amount such that a good monitoring of a diet and hence health is achieved.

Figure 10A:
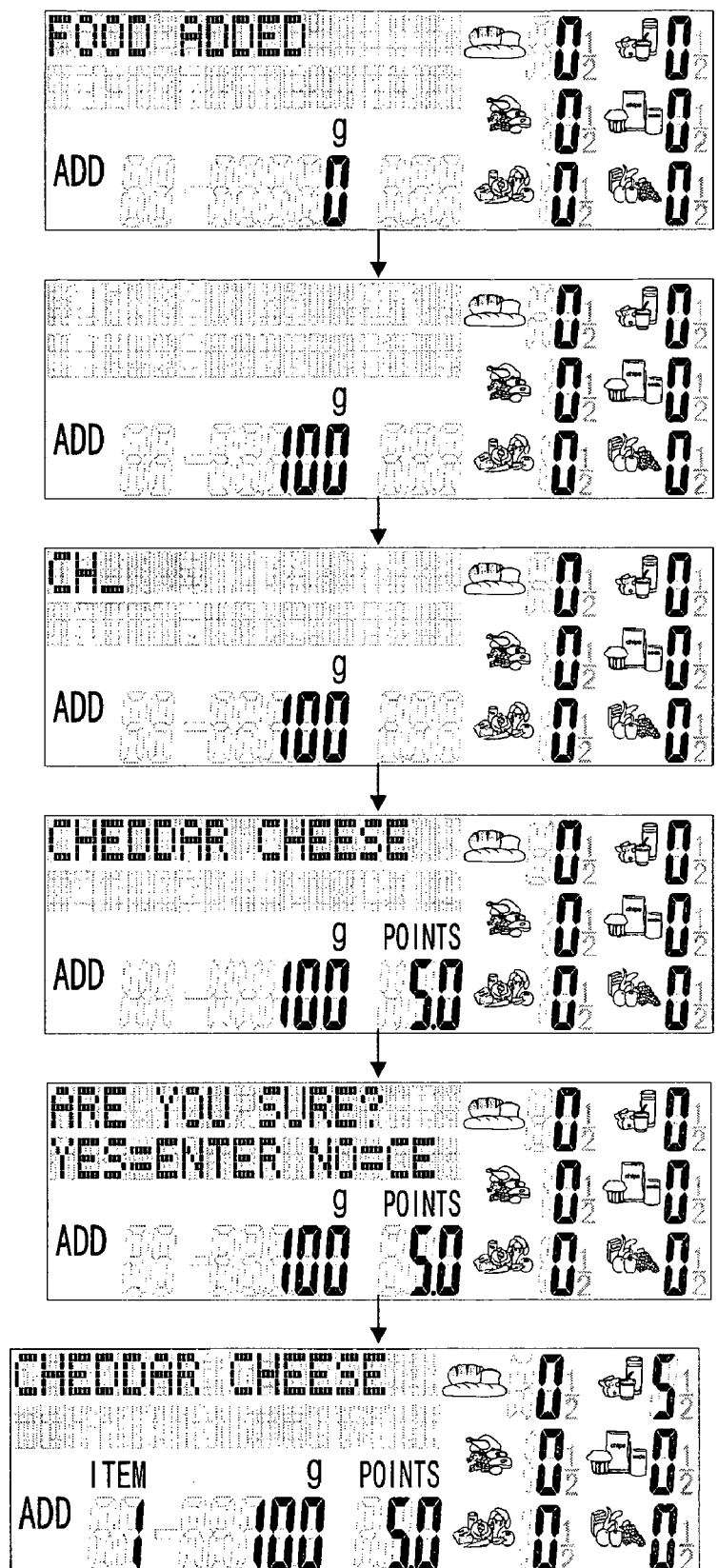
FIG. 10A is a series of exemplary displays for a process of operation for adding food into the nutrition balance of the present invention.
Figure 10B:
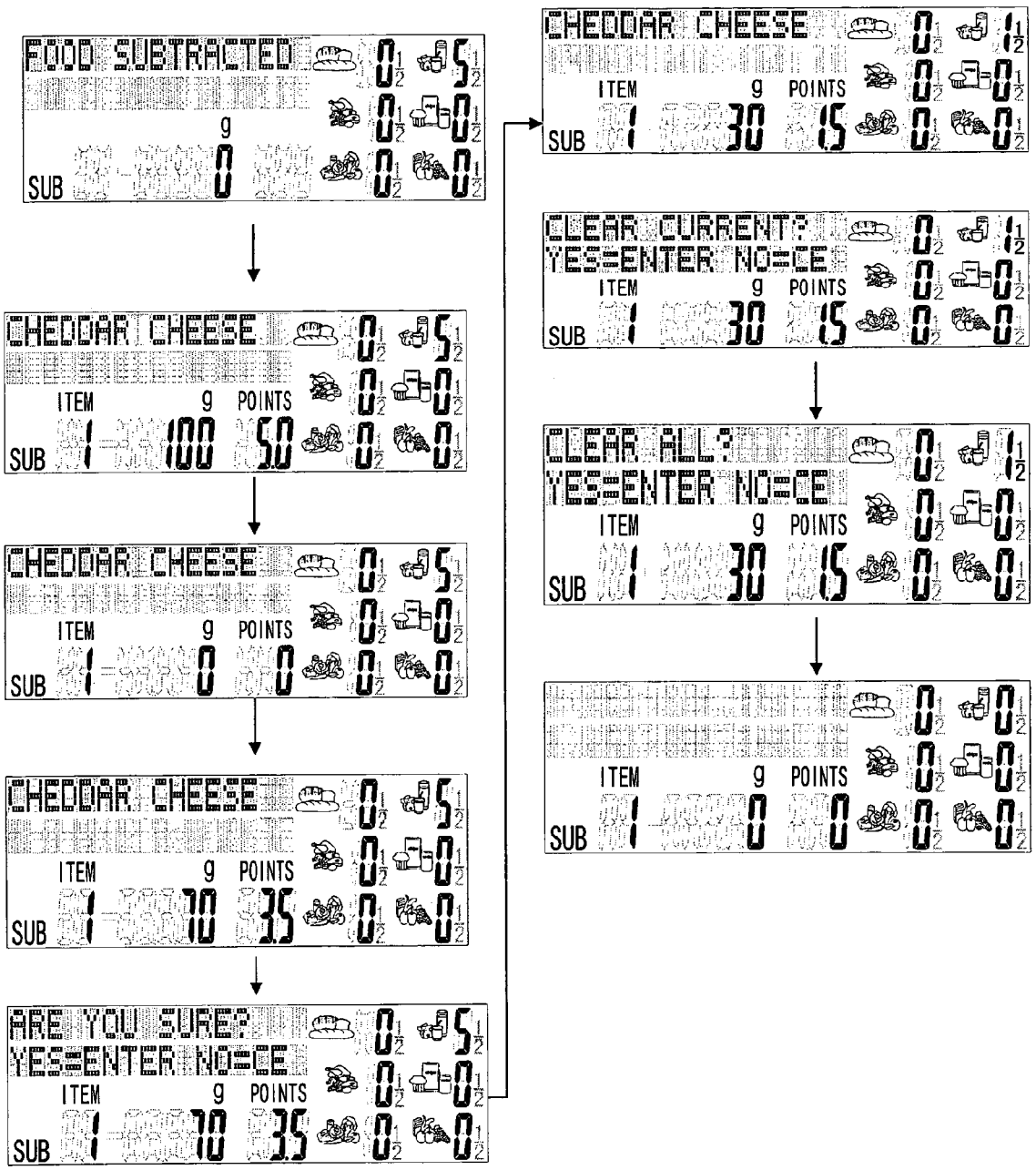
FIG. 10B is a series of exemplary displays for a process of operation for subtracting an excess food from the nutrition balance of the present invention.
Figure 10C:
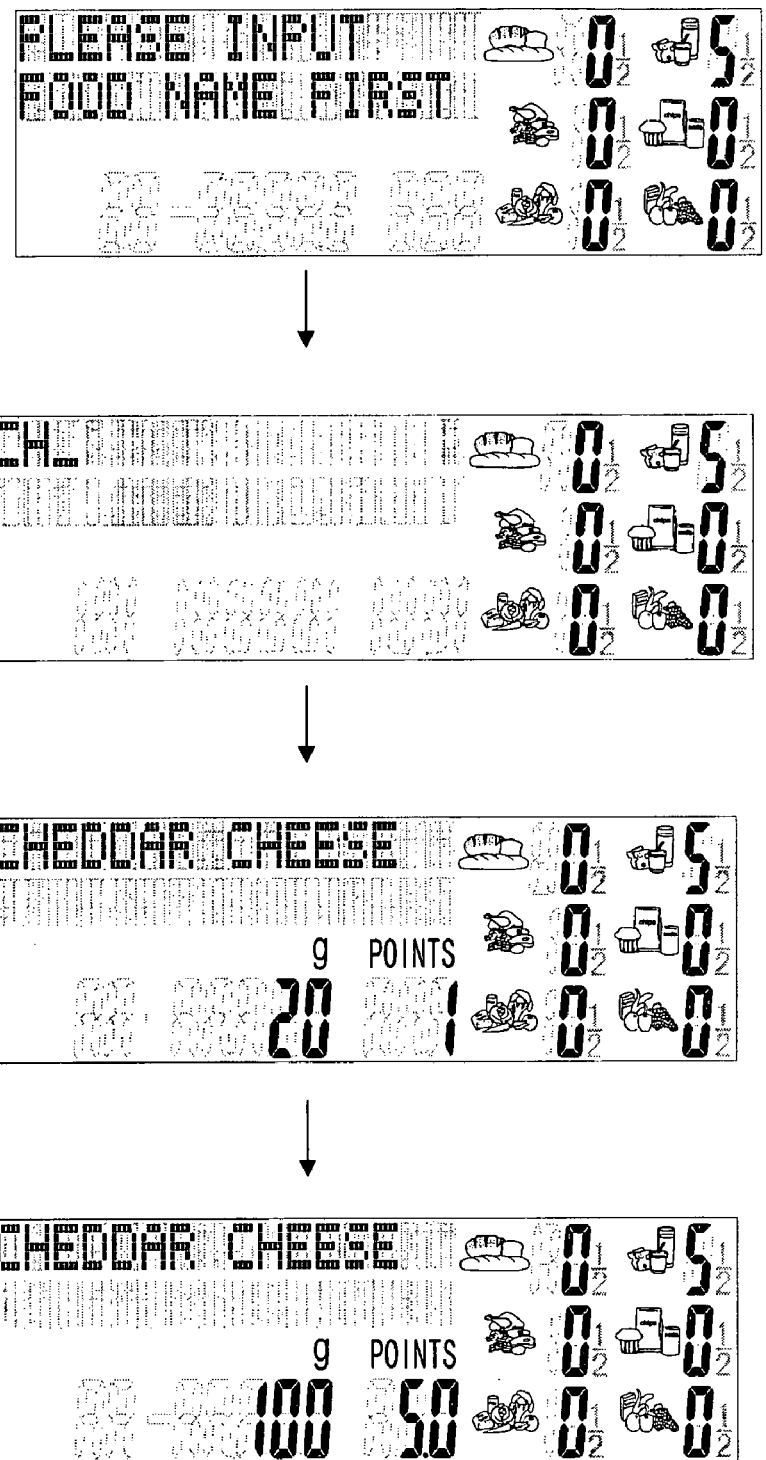
FIG. 10C is a series of exemplary displays for a process of food enquiry of the nutrition balance of the present invention.

In order to fully understand the operation of the nutrition balance of the present invention, a plurality of processes under the operation of addition method of the nutrition balance of the present invention are shown in FIG. 10A to 10C of the drawings.

Referring to FIG. 10A to 10C of the drawings, a predetermined illustrative display is shown consisting of six food figures representing the six groups of food according to the food guide pyramid. As shown in the display, an "ADD" is representing the mode of the process of calculation, the addition method of the nutrition balance, a "g" is the unit of measurement in grams, a "food add" is the indication of a status of the nutrition balance which represents a starting step for adding food, a "item" is a serial number of the food being added, a "points" is the total food exchange units of the food being added, and a "cheddar cheese" is a name of the food being added in the example shown in FIG. 10A to 10C of the drawings.

Referring to FIG. 10A of the drawing, a series of exemplary displays for a process of operation for adding food into the nutrition balance of the present invention is shown wherein the process comprises the steps of:

a) turning on the power of the nutrition balance and entering into a default mode of the process of calculation after a predetermined initiating time wherein the mode of the process of calculation is the addition method;

b) resetting the nutrition balance to zero by a first predetermined operation key;

c) showing the weight of a food according to the food provided on the scale unit;

d) entering the name of the food through the control unit;

e) showing the food exchange unit of the food according to the name of the food entered in step (d);

e) requesting a confirmation for adding food; and f) receiving the confirmation for adding food and calculating the food exchange units under each of the six food groups wherein the food exchange units are displayed next to the six food figures respectively according to the food exchange units of each of the six groups contained in the food.

Referring to the exemplary displays in FIG. 10A, the first operation key is "zero/." Key. When a container is required to hold the food, the process of operation for adding food further comprises the step (a') providing a container on the scale unit after step (a).

When an excess food is required to be deducted, a process of operation for subtracting an excess food from the nutrition balance of the present invention is provided. Referring to FIG. 10B of the drawings, a series of exemplary displays for the process of operation for subtracting an excess food from the nutrition balance comprises the steps of:

a) turning on the power of the nutrition balance and entering into a default mode of the process of calculation after a predetermined initiating time wherein the mode of the process of calculation is the addition method;

b) switching to a subtraction mode through a second predetermined operation key which is a "0/mode" key;

c) searching the excess food through a third predetermined operation key which is a "up" key;

d) setting the nutrition balance to an excess food weighing mode for weighing the excess food through a fifth predetermined operation key which is a "set/view" key;

e) weighing the excess food by providing the excess food on the scale unit wherein the weight, the points, the food exchange units of the excess food are shown in the display;

f) subtracting the excess food from the nutrition balance through pressing a sixth predetermined function key which is a "add/sub" key;

g) requesting a confirmation for subtracting the excess food;

h) receiving the confirmation for subtracting the excess food and calculating the food exchange units under each of the six food groups of the excess food and subtracting the food exchange units under each of the six food groups of the excess food; and i) determining the food exchange units under each of the six food groups in the nutrition balance after step (h).

Alternately, step (c) may be replaced by step (c') searching the excess food through a forth predetermined operation key which is a "down" key.

Therefore, the excess food is deducted from the nutrition balance through the process of operation for subtracting excess food. A seventh operation key which is a "CE" key is provided for restoring to a predetermined step during the process of operation. On the other hand, if the excess food is equal to the food added, the excess food may be subtracted from the nutrition balance by the process of operation for subtracting excess food wherein the steps (d), (e) and (f) are replaced by a step (d') subtracting the excess food from the nutrition balance through pressing the "CE" key.

In the exemplary displays as shown in FIG. 10A to 10C of the drawings, all the food being added in the nutrition balance is capable of being clear and subtracted from the nutrition balance through pressing CE key for 3 seconds.

Referring to FIG. 10C of the drawings, a series of exemplary displays for a process of food enquiry is shown wherein the process comprises the steps of e1) turning on the power of the nutrition balance and entering into a default mode of the process of calculation after a predetermined initiating time; e2) switching to an enquiry mode through an eighth operation key which is a "food" key; and e3) entering the name of a food. Then a weight corresponding to a unit caloric value of the food is obtained wherein the unit caloric value is equal to 80 kilocalories. Alternately, a food exchange unit of 100 g of the food is obtained through pressing the "up" key or the "down" key.

Furthermore, a ninth key "left" key and a tenth key "right" key are provided for searching other names of the food after step (e3).

In order to fully understand the operation of the nutrition balance of the present invention, a plurality of processes under the operation of subtraction method of the nutrition balance of the present invention are shown in FIG. 11A-11I of the drawings.

Personal information such as the sex, age, height, weight, labour type (representing the exercise level) of a user and date and clock information may be entered into the nutrition balance. Examples of display are shown in FIGS. 11A to 11F of the drawings.

Figure 11A:
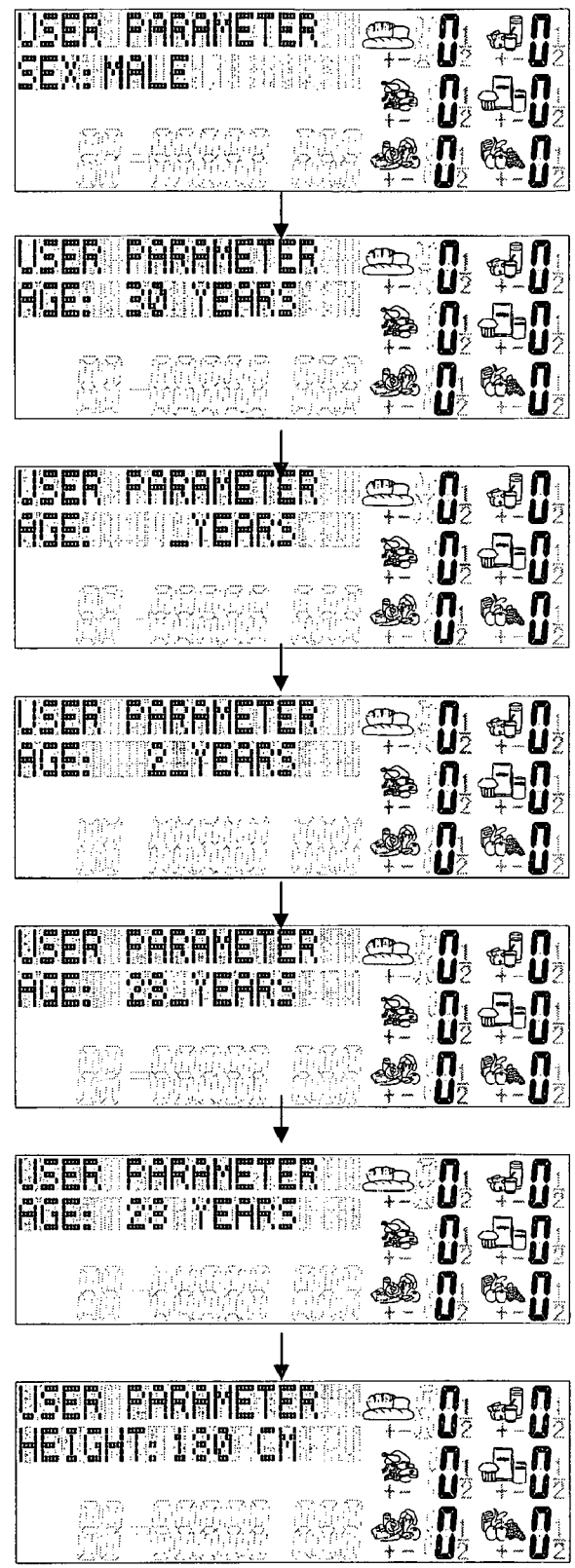
FIG. 11A to 11E are a series of exemplary displays for personal information of the nutrition balance of the present invention.

Referring to FIG. 11A of the drawings, the personal information of male, aged 28, and height 180 cm is used in the exemplary displays. The personal information being entered is capable of changing by pressing "CE" to restoring to a predetermined previous step as in the exemplary displays which show that the personal information of age is changed from 30 to 28 as the personal information of age 30 is not correct.

Figure 11B:
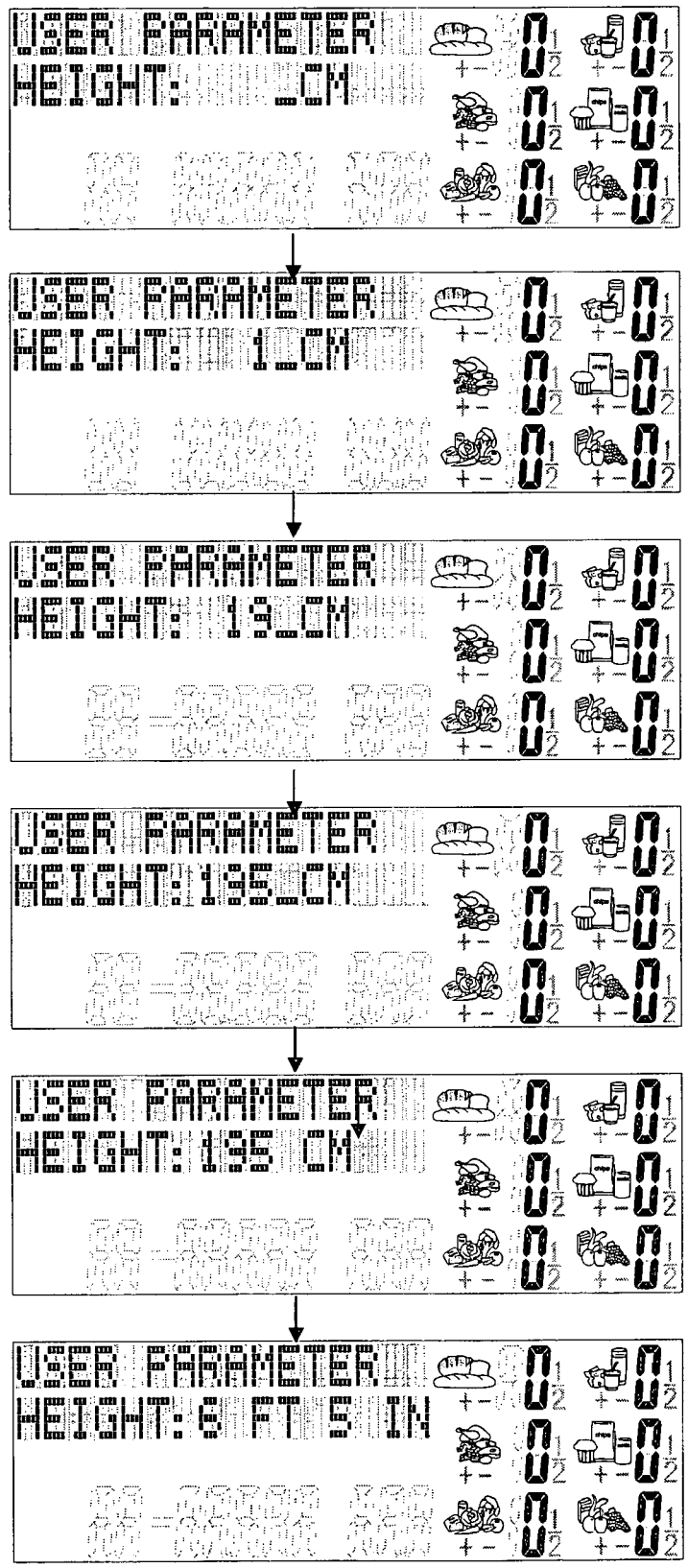

Referring to FIG. 11B of the drawings, the personal information of height being entered is changed from 180 to 195 by pressing "CE" in a mode of user parameter height as shown. The unit of height is capable of being changed from centimeter (cm) to feet (ft) and inch (in).

Figure 11C:
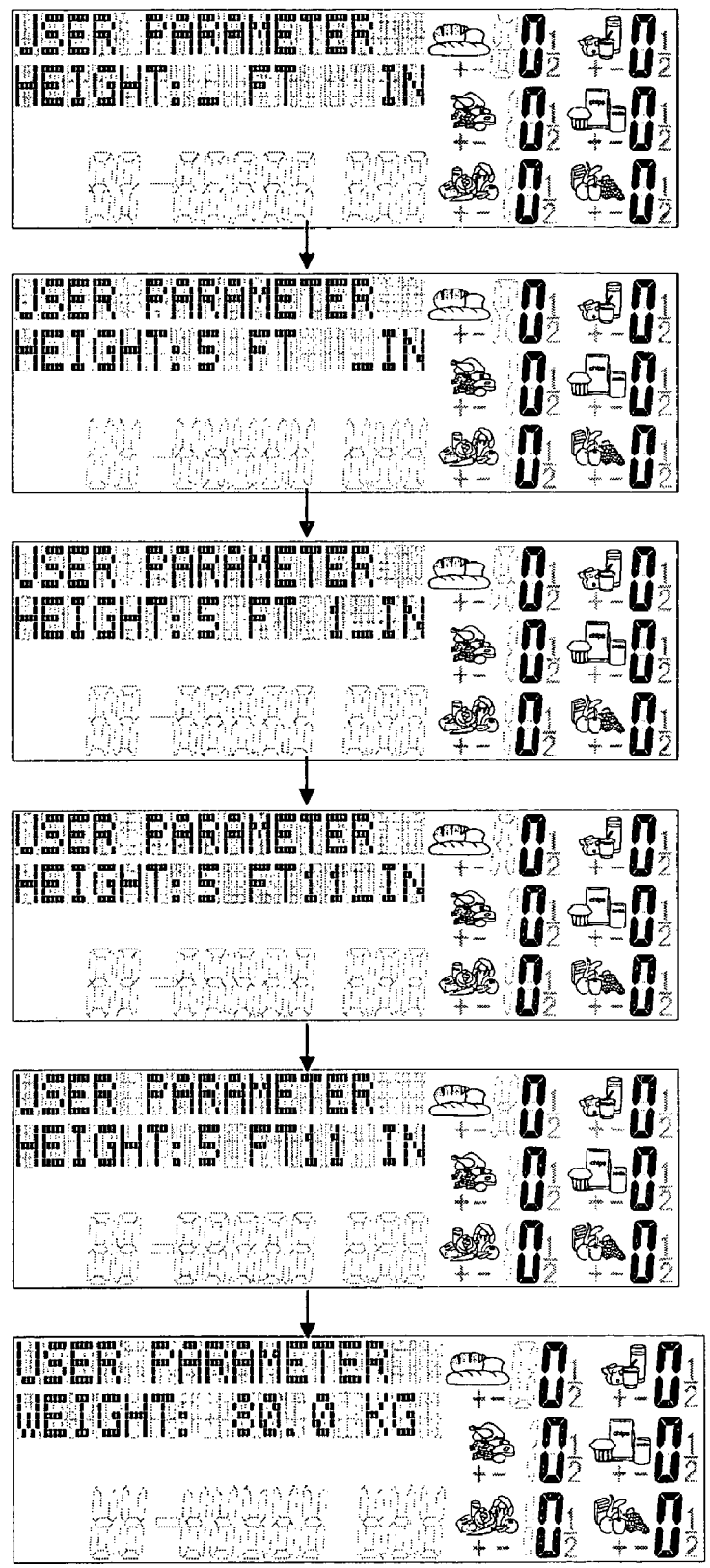

Referring to FIG. 11C of the drawings, the personal information of height being entered is changed from 6 ft 5 in to 5 ft 11 in is shown. The user parameter is capable of selected through the control unit such as "left" key and "right" key. The user parameter displayed is changed from height to weight in FIG. 11C as shown.

Figure 11D:
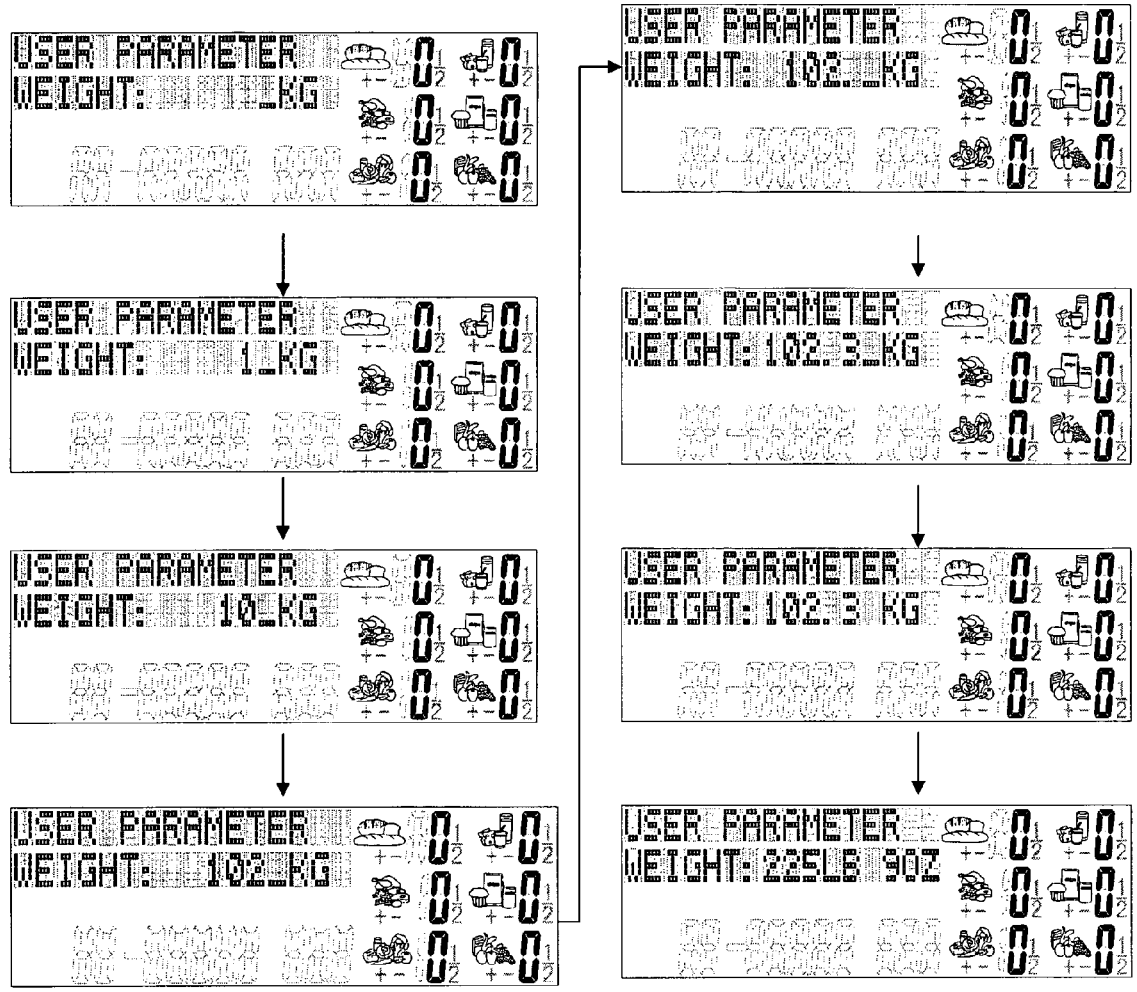

Referring to FIG. 11D of the drawings, the personal information of weight entered is changed from 80 kg to 102.3 kg as shown. The unit of weight is capable of displaying in kg or in pound (lb) and ounce (oz) as desired.

Figure 11E:
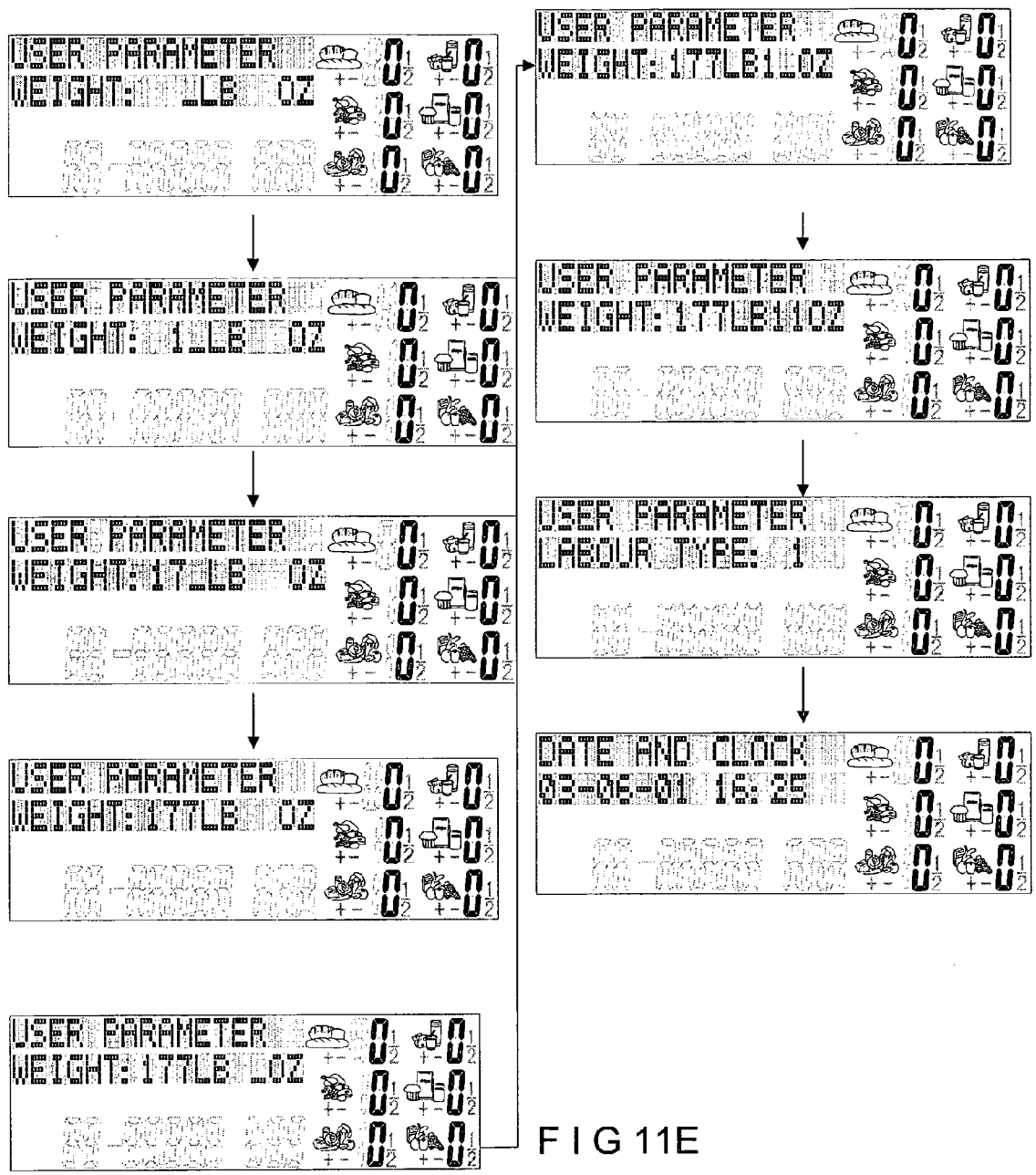

Referring to FIG. 11E of the drawings, the personal information of weight entered is changed from 225 lb 9 oz to 177 lb 11 oz. After entering the personal information of weight as 177 lb 11 oz, the display may be changed to show other personal information, i.e. other personal parameter, through the control unit such as "left" key and "right" key in the exemplary displays in FIG. 11E as shown. Similarly, through the control unit, date and clock may be displayed. The personal information of labour type is 1 in the exemplary display. The date and clock are 3 Jun. 2001 and 16:25 respectively as shown in the exemplary displays in FIG. 11E of the drawings.

Figure 11F:
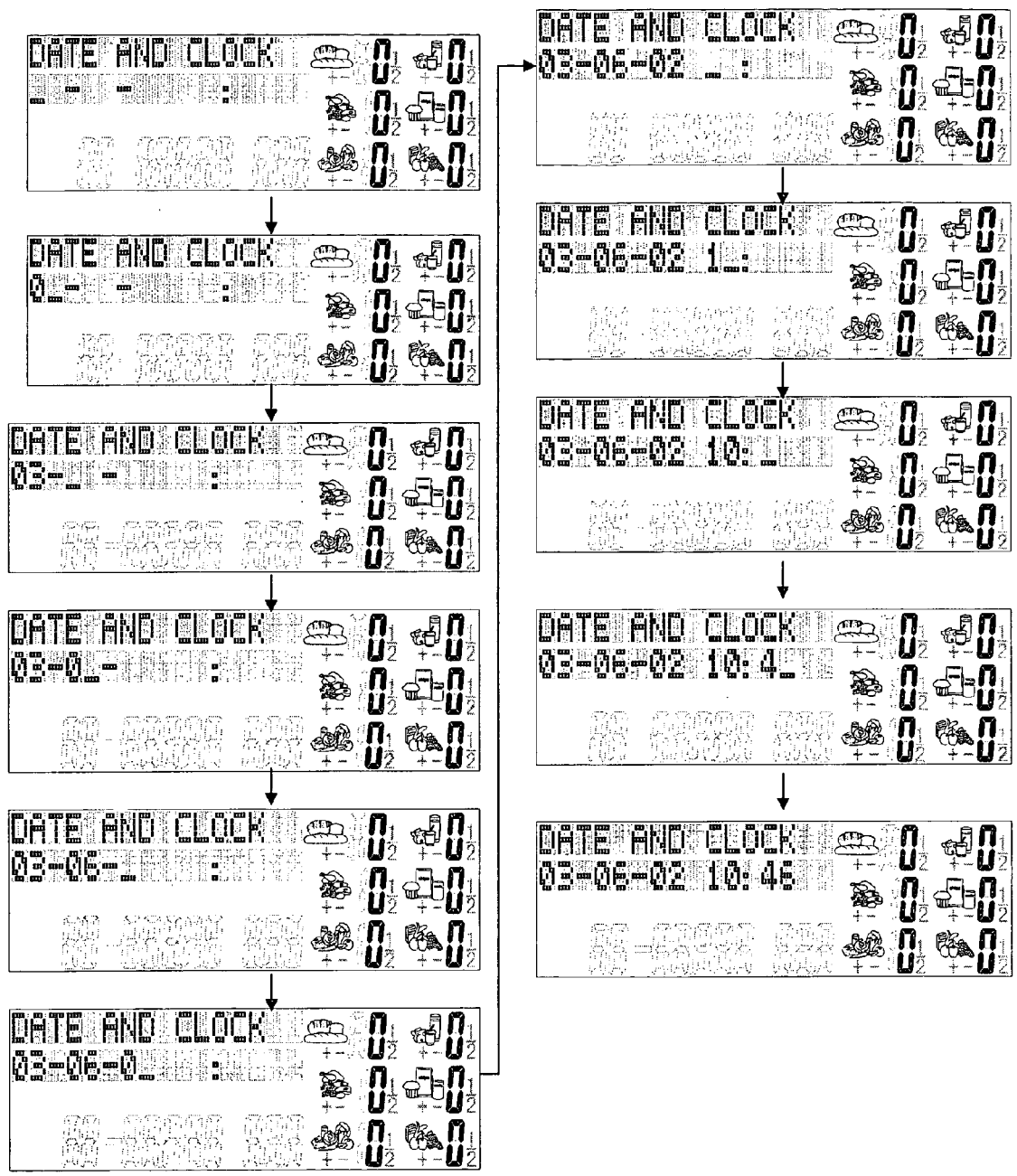
FIG. 11F is a series of exemplary displays for showing time and date of the nutrition balance of the present invention.

Referring to FIG. 11F of the drawings, the date and clock is changed to 3 Jun. 2002 and 10:46 respectively as shown in the exemplary displays.

Figure 11G:
FIG. 11G are a series of exemplary displays for a process of operation for adding food for subtraction from the nutrition balance of the present invention.

After entering the personal information of an user, a total caloric requirement will be determined for the user and the food exchange unit requirement of each of the six food groups will be displayed as in the manner shown in the first exemplary display of FIG. 11G.

For the exemplary displays of FIG. 11G of the drawings, the personal information of female, age 30, height 181 cm, weight 72.5 kg, light exercise level is input such that a total caloric requirement of 2187 kcal is obtained and food exchange unit requirements of each of the six food groups are obtained and displayed as 15 ½, 2, 5, 2, 2, and 1 respectively.

As shown in FIG. 11G of the drawings, a series of exemplary display for the process of operation for adding food for subtraction from the nutrition balance of the present invention is provided which comprises the steps of:

a) turning on the power of the nutrition balance and entering into a default mode of the process of calculation after a predetermined initiating time wherein the mode of the process of calculation is the addition method;

b) resetting the nutrition balance to zero by a first predetermined operation key;

c) showing the weight of a food according to the food provided on the scale unit;

d) entering the name of the food through the control unit;

e) showing the food exchange unit of the food according to the name of the food entered in step (d);

e) requesting a confirmation for adding food; and f) receiving the confirmation for adding food and calculating a remaining food exchange unit requirements under each of the six food groups wherein the remaining food exchange units requirement are displayed next to the six food figures respectively according to the food exchange units of each of the six groups contained in the food.

The remaining food exchange unit requirement is obtained by subtracting the total food exchange unit requirement by the food exchange unit of the food being added. The first operation key being used is a "zero/." key. When a container is required to hold the food, the process of operation for adding food further comprises the step (a') providing a container on the scale unit after step (a). The step (d) of the process may also be replaced by the step (d') searching the name of the food through the control unit by pressing the "left" or the "right" key of the control unit.

As shown in FIG. 11G of the drawings, the food added is cheddar cheese which is 100 grams in weight serving 5 food exchange units. After the cheddar cheese is added, the food exchange unit of a group which cheese belonged to is changed from −2 to +3 as shown.

Figure 11H:
FIG. 11H are a series of exemplary displays for a process of operation for subtracting food from the nutrition balance of the present invention.

When an excess food is required to be deducted, a process of operation for subtracting an excess food from the nutrition balance of the present invention is also provided. The exemplary display for the process is shown in FIG. 11H of the drawings comprising the steps of:

a) turning on the power of the nutrition balance and entering into a default mode of the process of calculation after a predetermined initiating time wherein the mode of the process of calculation is the addition method;

b) switching to a subtraction mode through a second predetermined operation key which is a "0/mode" key;

c) searching the excess food through a third predetermined operation key which is a "up" key;

d) setting the nutrition balance to an excess food weighing mode for weighing the excess food through a fifth predetermined operation key which is a "set/view" key;

e) weighing the excess food by providing the excess food on the scale unit wherein the weight, the points, the food exchange units of the excess food are shown in the display;

f) subtracting the excess food from the nutrition balance through pressing a sixth predetermined function key which is a "add/sub" key;

g) requesting a confirmation for subtracting the excess food;

h) receiving the confirmation for subtracting the excess food and calculating the food exchange units under each of the six food groups of the excess food and adding the food exchange units under each of the six food groups of the excess food to the food exchange unit requirements; and i) determining the remaining food exchange unit requirement under each of the six food groups in the nutrition balance after step (h).

Alternately, step (c) may be replaced by step (c') searching the excess food through a forth predetermined operation key which is a "down" key. A "CE" key is also provided for restoring to a predetermined step during the process of operation.

In FIG. 11H of the drawings, the exemplary displays shows that 70 grams of cheddar cheese is subtracted from 100 grams of cheddar cheese and that the remaining food exchange unit is −½ thereafter. After subtracting 70 grams of cheddar cheese, the remaining 30 grams of cheddar cheese is subtracted by pressing "CE" key which is then confirmed through "enter" key.

Figure 11I:
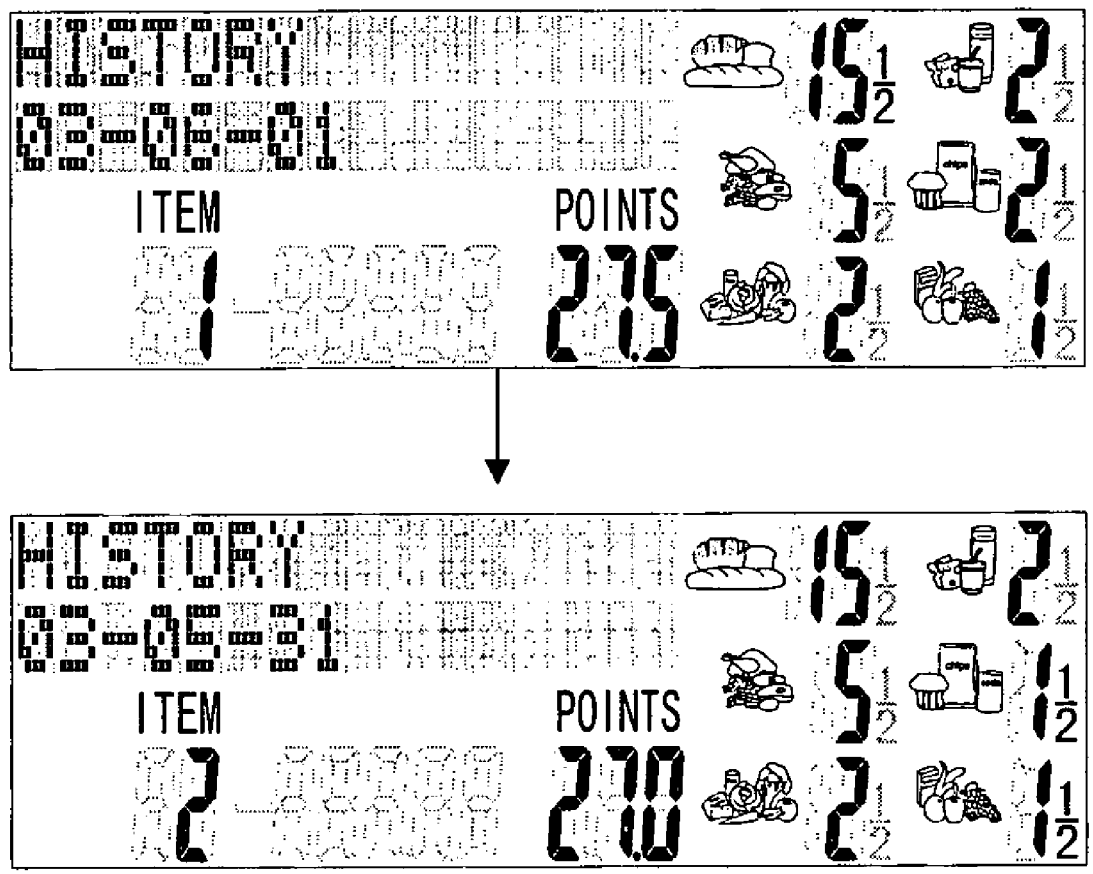
FIG. 11I are exemplary displays for showing history of the nutrition balance of the present invention.

Referring to FIG. 11I of the drawings, the exemplary displays for showing history are shown. The history includes information stored in the nutrition balance. An operation key History key is provided for switching to view the history stored in the nutrition balance. Other operation keys such as a "left" and a "right" key are provided for searching food history in a backward and forward manner. In the exemplary display as shown in FIG. 11I of the drawings, a daily history of 30 days is stored in the nutrition balance.

FIGS. 11A to 11I are exemplary displays acting only as operation examples for illustrating a plurality of possible operations of the nutrition balance of the present invention. The control unit, such as "enter" key, "history" key and "CE", being described is for illustrative purpose only and other input methods may be employed as desired for the present invention.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A nutrition balance, comprising:

a scale unit for generating a weight signal in responsive to a weight of each of edible substances before intake;

a control system, which comprises:

a nutrition balance database storing a plurality of caloric values of edible substances with respect to a food guide pyramid, a personal balance database storing user information for determining a body mass index of a user; and a controller generating a daily caloric intake determined by said weight signal in responsive to said nutrition balance database, and a daily caloric requirement in responsive to said body mass index;

a daily food exchange unit requirement generating a daily caloric control to control said daily caloric intake below said daily caloric requirement, wherein said daily caloric control is adapted for determining an amount of each of said edible substances being taken by said user that said caloric values of said edible substances are accumulatively added before said caloric values thereof reaches a value of said daily caloric requirement so as to provide a guidance of a balanced nutrition containing optimum carbohydrate, protein, and fat and to limit a total daily caloric intake from said edible substances for health control; and an input unit inputting said user information to said personal balance database, wherein said user information contains information of gender, height, body weight and daily exercise level of said user, such that said body mass index is determined based on said user information to generate said daily caloric requirement for said user.

2. The nutrition balance, as recited in claim 1, wherein said control system further comprises a diabetic caloric requirement database linked to said personal balance database to determine said body mass index of said user having Diabetes Mellitus.

3. The nutrition balance, as recited in claim 1, wherein said nutrition balance database contains six food groups that said controller generates said daily caloric intake for each of said food groups, wherein said daily caloric control controls said daily caloric intake of each of said food groups below said daily caloric requirement of said corresponding food group so as to ensure said balanced nutrition for each of said food groups, wherein said food groups are grain group, vegetable group, fruit group, milk based group, meat based group, and fat group with respect to said food guide pyramid.

4. The nutrition balance, as recited in claim 2, wherein said nutrition balance database contains six food groups that said controller generates said daily caloric intake for each of said food groups, wherein said daily caloric control controls said daily caloric intake of each of said food groups below said daily caloric requirement of said corresponding food group so as to ensure said balanced nutrition for each of said food groups, wherein said food groups are grain group, vegetable group, fruit group, milk based group, meat based group, and fat group with respect to said food guide pyramid.

5. The nutrition balance, as recited in claim 1, wherein said control system further comprises a memory unit recording said daily caloric intake to generate a daily caloric record for monitoring a total intake of caloric values of edible substances daily.

6. The nutrition balance, as recited in claim 2, wherein said control system further comprises a memory unit recording said daily caloric intake to generate a daily caloric record for monitoring a total intake of caloric values of edible substances daily.

7. The nutrition balance, as recited in claim 4, wherein said control system further comprises a memory unit recording said daily caloric intake to generate a daily caloric record for monitoring a total intake of caloric values of edible substances daily.

8. A process of controlling a daily caloric intake by a user, comprising the steps of:
- (a) generating a weight signal in responsive to a weight of each of edible substances before intake;
- (b) providing a plurality of caloric values of edible substances with respect to a food guide pyramid;
- (c) determining a body mass index of said user based on corresponding user information, and inputting information of gender, height, body weight and daily exercise level of said user as said user information, such that said body mass index is determined based on said user information to generate said daily caloric requirement for said user;
- (d) generating a daily caloric intake in responsive to said weight signal and a daily caloric requirement in responsive to said body mass index; and
- (e) generating a daily caloric control to control said daily caloric intake below said daily caloric requirement, wherein said daily caloric control is adapted for determining an amount of each of said edible substances being taken by said user that said caloric values of said edible substances are accumulatively added before said caloric values thereof reaches a value of said daily caloric requirement so as to provide a guidance of a balanced nutrition containing optimum carbohydrate, protein, and fat and to limit a total daily caloric intake from said edible substances for health control.

9. The process as recited in claim 8 wherein, in the step (c), said body mass index is determined for said user having Diabetes Mellitus.

10. The process, as recited in claim 8, wherein the step (b) further comprises a step of classifying said edible substances into six food groups such that said daily caloric intake is generated for each of said food groups, wherein said caloric control controls said daily caloric intake of each of said food groups below said daily caloric requirement of said corresponding food group so as to ensure said balanced nutrition for each of said food groups, wherein said food groups are grain group, vegetable group, fruit group, milk based group, meat based group, and fat group with respect to said food guide pyramid.

11. The process, as recited in claim 9, wherein the step (b) further comprises a step of classifying said edible substances into six food groups such that said daily caloric intake is generated for each of said food groups, wherein said caloric control controls said daily caloric intake of each of said food groups below said daily caloric requirement of said corresponding food group so as to ensure said balanced nutrition for each of said food groups, wherein said food groups are grain group, vegetable group, fruit group, milk based group, meat based group, and fat group with respect to said food guide pyramid.

12. The process, as recited in claim 8, further comprising a step of recording said daily caloric intake to generate a daily caloric record for monitoring a total intake of caloric values of edible substances daily.

13. The process, as recited in claim 9, further comprising a step of recording said daily caloric intake to generate a daily caloric record for monitoring a total intake of caloric values of edible substances daily.

14. The process, as recited in claim 10, further comprising a step of recording said daily caloric intake to generate a daily caloric record for monitoring a total intake of caloric values of edible substances daily.

15. The process, as recited in claim 11, further comprising a step of recording said daily caloric intake to generate a daily caloric record for monitoring a total intake of caloric values of edible substances daily.

* * * * *